United States Patent
Li et al.

(10) Patent No.: US 12,473,258 B2
(45) Date of Patent: Nov. 18, 2025

(54) CRYSTAL FORM OF PYRIDINYLPHENYL COMPOUND AND PREPARATION METHOD THEREFOR

(71) Applicant: ZHUHAI UNITED LABORATORIES CO., LTD., Guangdong (CN)

(72) Inventors: Peng Li, Shanghai (CN); Xiaolin Li, Shanghai (CN); Zhi Luo, Shanghai (CN); Haiying He, Shanghai (CN); Guoping Hu, Shanghai (CN); Jian Li, Shanghai (CN); Shuhui Chen, Shanghai (CN)

(73) Assignee: ZHUHAI UNITED LABORATORIES CO., LTD., Guangdong (CN)

( * ) Notice: Subject to any disclaimer, the term of this patent is extended or adjusted under 35 U.S.C. 154(b) by 429 days.

(21) Appl. No.: 18/245,552

(22) PCT Filed: Sep. 28, 2021

(86) PCT No.: PCT/CN2021/121466
§ 371 (c)(1),
(2) Date: Mar. 16, 2023

(87) PCT Pub. No.: WO2022/063325
PCT Pub. Date: Mar. 31, 2022

(65) Prior Publication Data
US 2023/0365503 A1    Nov. 16, 2023

(30) Foreign Application Priority Data
Sep. 28, 2020   (CN) .................. 202011044638.7

(51) Int. Cl.
*C07D 213/73* (2006.01)

(52) U.S. Cl.
CPC ........ *C07D 213/73* (2013.01); *C07B 2200/13* (2013.01)

(58) Field of Classification Search
CPC .................. C07D 231/73; C07B 2200/13
See application file for complete search history.

(56) References Cited

U.S. PATENT DOCUMENTS

| | | | | |
|---|---|---|---|---|
| 11,753,377 B2 * | 9/2023 | Li | ................ | C07D 213/73 514/352 |
| 11,932,617 B2 * | 3/2024 | Li | ................ | C07D 401/12 |

FOREIGN PATENT DOCUMENTS

| | | |
|---|---|---|
| CN | 108135867 A | 6/2018 |
| CN | 111356451 A | 6/2020 |
| WO | 2020125659 A1 | 6/2020 |

OTHER PUBLICATIONS

Feb. 27, 2025 Chinese First Office Action issued in Chinese Patent Application No. 2021800658245.
Nov. 20, 2024 Extended European Search Report issued in European Patent Application No. 21871694.2.
Apr. 14, 2025 Korean First Office Action issued in Korean Patent Application No. 10-2023-7013684.
Guillory Ikedharry G Brittain(ED) Generation of Polymorphs, HYDRATESSOLVATES , and Amorphous SolidsJan. 1, 1999(Jan. 1, 1999) , Polymorphismin Pharmaceutical Solids , M. Dekker , USA pp. I-II.
Mar. 26, 2024 Japanese First Office Action issued in Japanese Patent Application No. 2023-519557.
Oct. 27, 2023 Australian First Office Action issued in Australian Patent Application No. 2021348707.
Hirayama Yoshinaki, organic compound crystal preparation, 2008, pp. 17 to 23,37, pp. 40,45 to 51,57, and 65.
Byrn, S. et al., Pharmaceutical Solids: A Strategic Approach to Regulatory Considerations, Pharmaceutical Research, 1995—954, vol. 12, No. 7,pp. 945.
Savjani, K.T. et al., Drug Solubility: Importance and Enhancement Techniques, International Scholarly Research Network ISRN Pharmaceutics, 2012—10, vol. 2012, p. 1.
Mino R. Caira, Crystalline Polymorphism of Organic Compounds, TOPICSIN Current Chemistry, Germany, Springer, 1998 , vol. 198,p. 163 to 208.
Takata, Drug at the stage of drug development and selection, pp. 01, 15, pp. 20-25, Pharm Stage, vol. 6, No. 10, 2007.
Ashizawa, A polymorphism of medicines and crystallisation, and 2002, pp. 273, 278, 305-317.
Dec. 30, 2021International Search Report issued in International Patent Application No. PCT/CN2021/121466.
Dec. 30, 2021Written Opinion of the International Searching Authority issued in International Patent Application No. PCT/CN2021/121466.

\* cited by examiner

*Primary Examiner* — Timothy R Rozof
(74) *Attorney, Agent, or Firm* — Houston Beshining Law Office PLLC; Liangang Ye

(57) ABSTRACT

A crystal form of a pyridinylphenyl compound and a preparation method therefor. Use of the crystal form in the preparation of a medicament of treating related diseases is also comprised.

20 Claims, 10 Drawing Sheets

CRYSTAL FORM OF PYRIDINYLPHENYL COMPOUND AND PREPARATION METHOD THEREFOR

The present application is a National Stage of International Application No. PCT/CN2021/121466, filed on Sep. 28, 2021, which claims priority of the Chinese Patent Application No. CN202011044638.7 filed on Sep. 28, 2020, the contents of which are incorporated herein by reference in their entireties.

TECHNICAL FIELD

The present disclosure relates to a crystal form of pyridinylphenyl compound and a preparation method therefor, and also comprises a use of the crystal form in the preparation of a medicament for treating related disease.

BACKGROUND

Dry eye, also known as keratoconjunctival sicca, refers to a general term for a variety of diseases with abnormal tear quality or quantity or abnormal dynamics caused by any reason, which results in a decrease in tear film stability and is accompanied by ocular discomfort (or) lesion characteristics of ocular surface tissue. Specific symptoms of discomfort are: eye irritation, visual disturbance and tear film instability. Some of these syndromes are caused by inflammation of the ocular surface, which results in a loss of lacrimal gland function. In addition, it is also associated with systemic autoimmunity.

Some toxic aldehydes, such as malondialdehyde (MDA) and 4-hydroxy-2-nonenal (4HNE), are produced by body or eye tissues and organs through metabolic mechanisms, etc. Therefore, these aldehydes are highly reacted with proteins, carbohydrates, lipids and DNA, leading to chemical modification of biomolecules, activating inflammatory molecular regulators such as NF-kappaB, thus promoting damage to different organs, which is one of the causes of dry eye syndrome.

Through the research in the present disclosure, a small molecule drug enters the ocular inflammation site in the form of eye drops, and has complexation reaction with the aldehydes in vivo, thereby reducing the toxicity of the aldehydes and inflammation, and achieving the effect of treating dry eye. The compound of formula (II) has good chemical stability, and one molecule of hydrate has crystal water, which is arranged in a dense crystal form; the compound of formula (II) can well complex with active aldehyde molecules in vivo and in vitro and well penetrates into the cornea, and plays an anti-inflammatory role in treating dry eye; after the administration of the eye drops in animals, the eye drops of the compound of formula (II) with the highest concentration do not cause any discomfort in animals. It is developed as a potential drug with properties of safety and effectiveness.

CONTENT OF THE PRESENT DISCLOSURE

The present disclosure provides a crystal form A of a compound of formula (I), wherein the crystal form A has an X-ray powder diffraction pattern comprising characteristic diffraction peaks at the following 2θ angles: 7.14±0.20°, 12.46±0.20° and 18.87±0.20°.

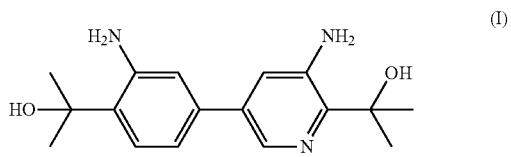 [SMILES: CC(C)(O)c1ccc(-c2cnc(C(C)(C)O)c(N)c2)cc1N]

In some embodiments of the present disclosure, the X-ray powder diffraction pattern of the crystal form A has characteristic diffraction peaks at the following 2θ angles: 7.14±0.20°, 12.46±0.20°, 15.99±0.20°, 17.06±0.20°, 18.87±0.20°, 20.25±0.20°, 21.41±0.20° and 25.00±0.20°.

In some embodiments of the present disclosure, the X-ray powder diffraction pattern of the crystal form A has characteristic diffraction peaks at the following 2θ angles: 7.14±0.20°, 10.11±0.20°, 12.46±0.20°, 14.35±0.20°, 15.99±0.20°, 17.06±0.20°, 18.87±0.20° and 20.25±0.20°, 21.41±0.20°, 25.00±0.20°.

The present disclosure provides a crystal form A of a compound of formula (I), wherein the crystal form A has an X-ray powder diffraction pattern comprising characteristic diffraction peaks at the following 2θ angles: 7.142±0.200°, 12.456±0.200° and 18.868±0.200°.

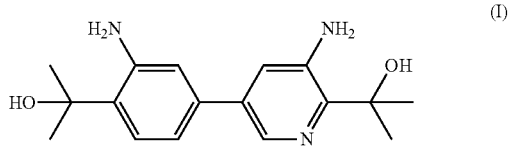 [SMILES: CC(C)(O)c1ccc(-c2cnc(C(C)(C)O)c(N)c2)cc1N]

In some embodiments of the present disclosure, the X-ray powder diffraction pattern of the crystal form A has characteristic diffraction peaks at the following 2θ angles: 7.142±0.200°, 12.456±0.200°, 15.993±0.200°, 17.057±0.200°, 18.868±0.200°, 20.249±0.200°, 21.413±0.2000 and 24.995±0.200°.

In some embodiments of the present disclosure, the X-ray powder diffraction pattern of the crystal form A has characteristic diffraction peaks at the following 2θ angles: 7.142±0.200°, 12.456±0.200°, 14.347±0.200°, 15.993±0.200°, 17.057±0.200°, 18.868±0.200°, 20.249±0.200°, 21.413±0.200°, 24.995±0.200°, 25.897±0.200°, 29.566±0.200° and 30.442±0.200°.

In some embodiments of the present disclosure, the X-ray powder diffraction pattern of the crystal form A has characteristic diffraction peaks at the following 2θ angles: 7.142°, 8.234°, 10.112°, 11.302°, 12.056°, 12.377°, 12.456°, 14.086°, 14.347°, 15.993°, 16.530°, 16.834°, 17.057°, 17.482°, 18.868°, 20.249°, 21.413°, 22.599°, 22.721°, 23.750°, 23.941°, 24.191°, 24.763°, 24.995°, 25.897°, 27.931°, 29.566°, 30.442°, 31.373°, 31.582°, 32.162°, 32.936°, 33.830°, 34.537°, 34.774°, 35.312°, 36.107°, 36.401° and 37.575°.

In some embodiments of the present disclosure, the XRPD pattern of the crystal form A is basically as shown in FIG. 1.

In some embodiments of the present disclosure, the analysis data of the XRPD pattern of the crystal form A is as shown in Table 1:

TABLE 1

Analysis data of the XRPD pattern of the crystal form A of the compound of formula (I)

| No. | 2θ (°) | Interplanar Distance (Å) | Strength (count) | Relative Strength (%) | Area | Relative Area (%) |
|---|---|---|---|---|---|---|
| 1 | 7.142 | 12.36787 | 6091.250 | 24.6 | 4105.750 | 20.8 |
| 2 | 8.234 | 10.72966 | 688.945 | 2.2 | 512.137 | 1.8 |
| 3 | 10.112 | 8.7405 | 1860.930 | 7.0 | 1389.670 | 6.4 |
| 4 | 11.302 | 7.82303 | 442.746 | 0.9 | 375.994 | 0.8 |
| 5 | 12.056 | 7.3349 | 678.664 | 1.8 | 551.168 | 1.7 |
| 6 | 12.377 | 7.14566 | 4349.720 | 17.1 | 3059.800 | 14.9 |
| 7 | 12.456 | 7.1003 | 7336.350 | 29.5 | 5469.130 | 27.6 |
| 8 | 14.086 | 6.2823 | 538.837 | 1.2 | 449.856 | 1.1 |
| 9 | 14.347 | 6.16869 | 2084.350 | 7.6 | 1655.690 | 7.4 |
| 10 | 15.993 | 5.53737 | 4893.480 | 19.2 | 3130.680 | 15.1 |
| 11 | 16.530 | 5.35842 | 611.988 | 1.4 | 521.994 | 1.3 |
| 12 | 16.834 | 5.26244 | 2731.760 | 10.2 | 2056.100 | 9.4 |
| 13 | 17.057 | 5.1941 | 3066.960 | 11.6 | 2318.500 | 10.7 |
| 14 | 17.482 | 5.06892 | 738.109 | 1.9 | 642.174 | 1.9 |
| 15 | 18.868 | 4.69953 | 24371.500 | 100.0 | 19265.800 | 100.0 |
| 16 | 20.249 | 4.38204 | 2827.430 | 10.7 | 2362.190 | 11.1 |
| 17 | 21.413 | 4.14633 | 5674.050 | 22.5 | 4761.370 | 23.8 |
| 18 | 22.599 | 3.93139 | 1360.670 | 4.6 | 1153.170 | 4.8 |
| 19 | 22.721 | 3.9106 | 1339.560 | 4.5 | 1147.680 | 4.7 |
| 20 | 23.750 | 3.74338 | 1845.510 | 6.6 | 1435.970 | 6.2 |
| 21 | 23.941 | 3.71399 | 1481.250 | 5.1 | 1355.840 | 5.8 |
| 22 | 24.191 | 3.67617 | 615.774 | 1.4 | 533.258 | 1.4 |
| 23 | 24.763 | 3.5925 | 2013.020 | 7.2 | 1788.210 | 7.9 |
| 24 | 24.995 | 3.55961 | 4012.070 | 15.4 | 3678.350 | 17.8 |
| 25 | 25.897 | 3.43763 | 2134.560 | 7.6 | 1705.360 | 7.4 |
| 26 | 27.931 | 3.19184 | 1002.170 | 3.0 | 849.375 | 3.1 |
| 27 | 29.566 | 3.01887 | 2078.290 | 7.5 | 1940.120 | 8.8 |
| 28 | 30.442 | 2.93396 | 2202.860 | 7.9 | 2066.000 | 9.4 |
| 29 | 31.373 | 2.84898 | 553.134 | 1.1 | 481.670 | 1.1 |
| 30 | 31.582 | 2.83061 | 1355.530 | 4.5 | 1318.350 | 5.5 |
| 31 | 32.162 | 2.78087 | 597.453 | 1.4 | 583.447 | 1.7 |
| 32 | 32.936 | 2.71734 | 1238.310 | 4.1 | 1170.520 | 4.8 |
| 33 | 33.830 | 2.64754 | 615.864 | 1.5 | 591.476 | 1.7 |
| 34 | 34.537 | 2.59494 | 695.321 | 1.7 | 653.167 | 2.0 |
| 35 | 34.774 | 2.57775 | 874.857 | 2.5 | 825.774 | 2.9 |
| 36 | 35.312 | 2.5397 | 841.814 | 2.3 | 815.207 | 2.8 |
| 37 | 36.107 | 2.48557 | 587.673 | 1.2 | 465.483 | 0.9 |
| 38 | 36.401 | 2.46622 | 1143.090 | 3.5 | 1121.390 | 4.3 |
| 39 | 37.575 | 2.39181 | 1219.500 | 3.8 | 1026.990 | 3.8 |

In some embodiments of the present disclosure, the differential scanning calorimetry curve of the crystal form A has endothermic peaks with an onset at 81.03±3.0° C., 113.62±3.0° C. and 151.37±3.0° C., respectively.

In some embodiments of the present disclosure, the DSC spectrum of the crystal form A is basically as shown in FIG. 2.

In some embodiments of the present disclosure, the thermogravimetric analysis curve of the crystal form A has a weight loss of 2.046% at 96.01° C.±3.0° C., and a weight loss of 7.708% at 163.66° C.±3.0° C.

In some embodiments of the present disclosure, the TGA spectrum of the crystal form A is basically as shown in FIG. 2.

The present disclosure provides a compound of formula (II),

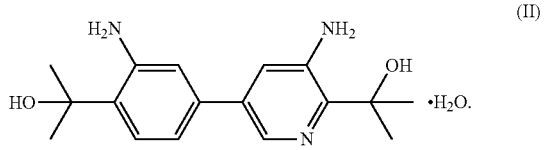

(II)

The present disclosure provides a crystal form B of the compound of formula (II), wherein the crystal form B has an X-ray powder diffraction pattern comprising characteristic diffraction peaks at the following 2θ angles: 8.231±0.200°, 17.058±0.200° and 18.955±0.200°.

In some embodiments of the present disclosure, the X-ray powder diffraction pattern of the crystal form B has characteristic diffraction peaks at the following 2θ angles: 8.231±0.200°, 17.058±0.200°, 18.955±0.200°, 21.712±0.200° and 25.678±0.200°.

In some embodiments of the present disclosure, the X-ray powder diffraction pattern of the crystal form B has characteristic diffraction peaks at the following 2θ angles: 8.231±0.200°, 12.068±0.200°, 16.505±0.200°, 17.058±0.200°, 18.955±0.200°, 21.712±0.200°, 24.242±0.200° and 25.678±0.200°.

In some embodiments of the present disclosure, the X-ray powder diffraction pattern of the crystal form B has characteristic diffraction peaks at the following 2θ angles: 7.083±0.200°, 8.231±0.200°, 11.294±0.200°, 12.068±0.200°, 14.091±0.200°, 16.505±0.200°, 17.058±0.200°, 18.955±0.200°, 21.712±0.200°, 24.242±0.200°, 25.678±0.200° and 30.869±0.200°.

The present disclosure provides a crystal form B of the compound of formula (II), wherein the X-ray powder diffraction pattern thereof has characteristic diffraction peaks at the following 2θ angles: 8.231±0.200°, 17.058±0.200°, and/or 18.955±0.200°, and/or 7.083±0.200°, and/or 11.294±0.200°, and/or 12.068±0.200°, and/or 14.091±0.200°, and/or 14.806±0.200°, and/or 16.505±0.200°, and/or 18.202±0.200°, and/or 21.712±0.200°, and/or 22.182±0.200°, and/or 23.903±0.200°, and/or 24.242±0.200°, and/or 24.653±0.200°, and/or 25.350±0.200°, and/or 25.678±0.200°, and/or 26.270±0.200°, and/or 27.001±0.200°, and/or 27.658±0.200°, and/or 29.052±0.200°, and/or 29.721±0.200°, and/or 30.869±0.200°, and/or 34.644±0.200°, and/or 35.009±0.200°.

In some embodiments of the present disclosure, the X-ray powder diffraction pattern of the crystal form B has characteristic diffraction peaks at the following 2θ angles: 7.083°, 8.231°, 11.294°, 12.068°, 14.091°, 14.806°, 16.505°, 17.058°, 18.202°, 18.955°, 21.712°, 22.182°, 23.903°, 24.242°, 24.653°, 25.350°, 25.678°, 26.270°, 27.001°, 27.658°, 29.052°, 29.721°, 30.869°, 34.644° and 35.009°.

In some embodiments of the present disclosure, the XRPD pattern of the crystal form B is basically as shown in FIG. 3.

In some embodiments of the present disclosure, the analysis data of the XRPD pattern of the crystal form B is basically as shown in Table 2:

TABLE 2

Analysis data of the XRPD pattern of the crystal form B of the compound of formula (II)

| No. | 2θ (°) | Interplanar Distance (Å) | Relative Strength (%) |
|---|---|---|---|
| 1 | 7.083 | 12.4700 | 10.0 |
| 2 | 8.231 | 10.7336 | 20.2 |
| 3 | 11.294 | 7.8279 | 9.7 |
| 4 | 12.068 | 7.3278 | 14.8 |
| 5 | 14.091 | 6.2798 | 12.9 |
| 6 | 14.806 | 5.9784 | 8.4 |
| 7 | 16.505 | 5.3665 | 13.9 |
| 8 | 17.058 | 5.1937 | 100.0 |
| 9 | 18.202 | 4.8697 | 5.9 |

TABLE 2-continued

Analysis data of the XRPD pattern of the crystal form B of the compound of formula (II)

| No. | 2θ (°) | Interplanar Distance (Å) | Relative Strength (%) |
|---|---|---|---|
| 10 | 18.955 | 4.6780 | 95.1 |
| 11 | 21.712 | 4.0898 | 18.1 |
| 12 | 22.182 | 4.0041 | 13.1 |
| 13 | 23.903 | 3.7197 | 5.7 |
| 14 | 24.242 | 3.6683 | 13.1 |
| 15 | 24.653 | 3.6081 | 5.4 |
| 16 | 25.350 | 3.5105 | 12.1 |
| 17 | 25.678 | 3.4664 | 19.5 |
| 18 | 26.270 | 3.3896 | 7.3 |
| 19 | 27.001 | 3.2995 | 6.5 |
| 20 | 27.658 | 3.2226 | 5.4 |
| 21 | 29.052 | 3.0710 | 4.3 |
| 22 | 29.721 | 3.0034 | 4.3 |
| 23 | 30.869 | 2.8943 | 10.9 |
| 24 | 34.644 | 2.5871 | 4.8 |
| 25 | 35.009 | 2.5609 | 5.1 |

In some embodiments of the present disclosure, the differential scanning calorimetry curve of the crystal form B has endothermic peaks with an onset at 101.7±3.0° C. and 158.7±3.0° C., respectively.

In some embodiments of the present disclosure, the DSC spectrum of the crystal form B is basically as shown in FIG. 4.

In some embodiments of the present disclosure, the thermogravimetric analysis curve of the crystal form B has a weight loss of 5.477% at 120.00° C.±3.0° C.

In some embodiments of the present disclosure, the TGA spectrum of the crystal form B is basically as shown in FIG. 5.

The present disclosure provides a crystal form C of a compound of formula (I), wherein the crystal form C has an X-ray powder diffraction pattern comprising characteristic diffraction peaks at the following 2θ angles: 12.871±0.200°, 17.488±0.200° and 19.079±0.200°.

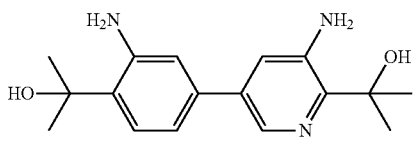
(I)

In some embodiments of the present disclosure, the X-ray powder diffraction pattern of the crystal form C has characteristic diffraction peaks at the following 2θ angles: 12.871±0.200°, 17.488±0.200°, 18.403±0.200°, 19.079±0.200°, 20.853±0.200°.

In some embodiments of the present disclosure, the X-ray powder diffraction pattern of the crystal form C has characteristic diffraction peaks at the following 2θ angles: 12.871±0.200°, 13.274±0.200°, 14.294±0.200°, 17.488±0.200°, 18.403±0.200°, 19.079±0.200°, 20.853±0.200° and 21.468±0.200°.

In some embodiments of the present disclosure, the X-ray powder diffraction pattern of the crystal form C has characteristic diffraction peaks at the following 2θ angles: 10.105±0.200°, 12.871±0.200°, 13.274±0.200°, 14.294±0.200°, 17.488±0.200°, 18.403±0.200°, 19.079±0.200°, 20.853±0.200°, 21.468±0.200°, 22.647±0.200°, 23.977±0.200° and 24.409±0.200°.

In some embodiments of the present disclosure, the X-ray powder diffraction pattern of the crystal form C has characteristic diffraction peaks at the following 2θ angles: 9.128°, 10.105°, 12.871°, 13.274°, 13.933°, 14.294°, 16.420°, 17.488°, 18.403°, 19.079°, 20.853°, 21.468°, 22.647°, 23.042°, 23.507°, 23.977°, 24.409°, 24.798°, 25.861°, 26.309°, 28.698°, 30.293° and 37.464°.

In some embodiments of the present disclosure, the XRPD pattern of the crystal form C is basically as shown in FIG. 6.

In some embodiments of the present disclosure, the analysis data of the XRPD pattern of the crystal form C is basically as shown in Table 3:

TABLE 3

Analysis data of the XRPD pattern of the crystal form C of the compound of formula (I)

| No. | 2θ (°) | Interplanar Distance (Å) | Relative Strength (%) |
|---|---|---|---|
| 1 | 9.128 | 9.6800 | 5.4 |
| 2 | 10.105 | 8.7467 | 8.1 |
| 3 | 12.871 | 6.8721 | 43.6 |
| 4 | 13.274 | 6.6643 | 13.3 |
| 5 | 13.933 | 6.3507 | 3.5 |
| 6 | 14.294 | 6.1914 | 9.9 |
| 7 | 16.420 | 5.3939 | 6.4 |
| 8 | 17.488 | 5.0670 | 100.0 |
| 9 | 18.403 | 4.8170 | 36.0 |
| 10 | 19.079 | 4.6479 | 76.1 |
| 11 | 20.853 | 4.2562 | 16.4 |
| 12 | 21.468 | 4.1357 | 10.6 |
| 13 | 22.647 | 3.9231 | 8.6 |
| 14 | 23.042 | 3.8567 | 5.8 |
| 15 | 23.507 | 3.7815 | 6.8 |
| 16 | 23.977 | 3.7084 | 9.5 |
| 17 | 24.409 | 3.6436 | 7.4 |
| 18 | 24.798 | 3.5874 | 6.3 |
| 19 | 25.861 | 3.4423 | 6.7 |
| 20 | 26.309 | 3.3847 | 6.8 |
| 21 | 28.698 | 3.1081 | 5.5 |
| 22 | 30.293 | 2.9480 | 4.6 |
| 23 | 37.464 | 2.3985 | 5.0 |

In some embodiments of the present disclosure, the differential scanning calorimetry curve of the crystal form C has an endothermic peak with an onset at 157.36±3.0° C.

In some embodiments of the present disclosure, the DSC spectrum of the crystal form C is basically as shown in FIG. 7.

In some embodiments of the present disclosure, the thermogravimetric analysis curve of the crystal form C has a weight loss of 1.589% at 120.00° C.±3.0° C.

In some embodiments of the present disclosure, the TGA spectrum of the crystal form C is basically as shown in FIG. 7.

The present disclosure further provides a compound of formula (III),

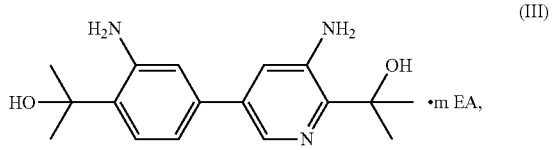
(III)

wherein m is selected from 0 to 1, preferably 0, 0.25, 0.5 or 1.

In some embodiments of the present disclosure, the above-mentioned compound has the structure of formula (III-1):

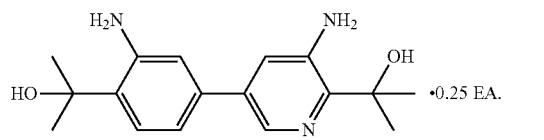

(III-1)

·0.25 EA.

The present disclosure provides a crystal form D of the compound of formula (III-1), wherein the crystal form D has an X-ray powder diffraction pattern comprising characteristic diffraction peaks at the following 2θ angles: 6.600±0.200°, 17.775±0.200° and 19.138±0.200°.

In some embodiments of the present disclosure, the X-ray powder diffraction pattern of the crystal form D has characteristic diffraction peaks at the following 2θ angles: 6.600±0.200°, 13.178±0.200°, 17.775±0.200°, 19.138±0.2000 and 25.798±0.200°.

In some embodiments of the present disclosure, the X-ray powder diffraction pattern of the crystal form D has characteristic diffraction peaks at the following 2θ angles: 6.600±0.200°, 13.178±0.200°, 17.303±0.200°, 17.775±0.200°, 18.667±0.200°, 19.138±0.200°, 21.245±0.200° and 25.798±0.200°.

In some embodiments of the present disclosure, the X-ray powder diffraction pattern of the crystal form D has characteristic diffraction peaks at the following 2θ angles: 6.600±0.200°, 11.004.200°, 13.178±0.200°, 15.521±0.200°, 16.592±0.200°, 17.303±0.200°, 17.775±0.200°, 18.667±0.200°, 19.138±0.200°, 21.245±0.200°, 25.798±0.200° and 27.353±0.200°.

In some embodiments of the present disclosure, the X-ray powder diffraction pattern of the crystal form D has characteristic diffraction peaks at the following 2θ angles: 6.600°, 8.659°, 9.558°, 11.004°, 12.463°, 13.178°, 13.728°, 14.871°, 15.521°, 16.592°, 17.303°, 17.775°, 18.379°, 18.667°, 19.138°, 20.572°, 21.245°, 21.989°, 22.247°, 22.561°, 23.940°, 25.087°, 25.798°, 26.686°, 27.353°, 28.044°, 28.859°, 29.645°, 30.375°, 32.351°, 34.603°, 35.456° and 39.550°.

In some embodiments of the present disclosure, the XRPD pattern of the crystal form D is basically as shown in FIG. 8.

In some embodiments of the present disclosure, the analysis data of the XRPD pattern of the crystal form D is basically as shown in Table 4:

TABLE 4

| | Analysis data of the XRPD pattern of the crystal form D of the compound of formula (III-1) | | |
|---|---|---|---|
| No. | 2θ (°) | Interplanar Distance (Å) | Relative Strength (%) |
| 1 | 6.600 | 13.3808 | 74.4 |
| 2 | 8.659 | 10.2035 | 10.8 |
| 3 | 9.558 | 9.2461 | 5.4 |
| 4 | 11.004 | 8.0341 | 22.9 |
| 5 | 12.463 | 7.0966 | 10.3 |
| 6 | 13.178 | 6.7128 | 39.0 |
| 7 | 13.728 | 6.4451 | 8.8 |
| 8 | 14.871 | 5.9521 | 14.2 |

TABLE 4-continued

| | Analysis data of the XRPD pattern of the crystal form D of the compound of formula (III-1) | | |
|---|---|---|---|
| No. | 2θ (°) | Interplanar Distance (Å) | Relative Strength (%) |
| 9 | 15.521 | 5.7045 | 15.6 |
| 10 | 16.592 | 5.3384 | 16.6 |
| 11 | 17.303 | 5.1206 | 26.4 |
| 12 | 17.775 | 4.9857 | 100.0 |
| 13 | 18.379 | 4.8233 | 5.1 |
| 14 | 18.667 | 4.7494 | 27.9 |
| 15 | 19.138 | 4.6336 | 87.2 |
| 16 | 20.572 | 4.3138 | 12.5 |
| 17 | 21.245 | 4.1787 | 24.2 |
| 18 | 21.989 | 4.0390 | 5.8 |
| 19 | 22.247 | 3.9926 | 6.9 |
| 20 | 22.561 | 3.9377 | 10.4 |
| 21 | 23.940 | 3.7140 | 14.7 |
| 22 | 25.087 | 3.5468 | 10.4 |
| 23 | 25.798 | 3.4506 | 45.7 |
| 24 | 26.686 | 3.3377 | 5.5 |
| 25 | 27.353 | 3.2578 | 18.8 |
| 26 | 28.044 | 3.1792 | 2.5 |
| 27 | 28.859 | 3.0912 | 2.9 |
| 28 | 29.645 | 3.0110 | 7.2 |
| 29 | 30.375 | 2.9402 | 9.8 |
| 30 | 32.351 | 2.7650 | 3.2 |
| 31 | 34.603 | 2.5900 | 4.0 |
| 32 | 35.456 | 2.5297 | 2.3 |
| 33 | 39.550 | 2.2767 | 2.7 |

In some embodiments of the present disclosure, the differential scanning calorimetry curve of the crystal form D has endothermic peaks with an onset at 116.98±3.0° C., 133.04±3.0° C. and 154.86±3.0° C., respectively.

In some embodiments of the present disclosure, the DSC spectrum of the crystal form D is basically as shown in FIG. 9.

In some embodiments of the present disclosure, the thermogravimetric analysis curve of the crystal form D has a weight loss of 6.939% at 150.00° C.±3.0° C.

In some embodiments of the present disclosure, the TGA spectrum of the crystal form D is basically as shown in FIG. 9.

The present disclosure provides a compound of formula (IV),

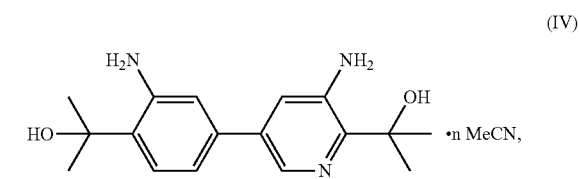

(IV)

·n MeCN, wherein n is selected from 0 to 1, preferably 0, 0.25, 0.5 or 1.

In some embodiments of the present disclosure, the above-mentioned compound has the structure of formula (IV-1):

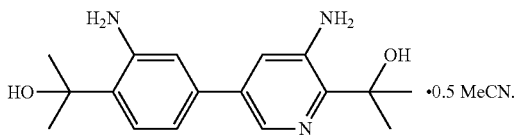

(IV-1)

The present disclosure provides a crystal form E of the compound of formula (IV-1), wherein the crystal form E has an X-ray powder diffraction pattern comprising characteristic diffraction peaks at the following 2θ angles: 18.097±0.200°, 18.691±0.200° and 20.693±0.200°.

In some embodiments of the present disclosure, the X-ray powder diffraction pattern of the crystal form E has characteristic diffraction peaks at the following 2θ angles: 17.465±0.200°, 18.097±0.200°, 18.691±0.200°, 19.179±0.200°, 20.693±0.200°.

In some embodiments of the present disclosure, the X-ray powder diffraction pattern of the crystal form E has characteristic diffraction peaks at the following 2θ angles: 6.675±0.200°, 16.119±0.200°, 17.465±0.200°, 18.097±0.200°, 18.691±0.200°, 19.179±0.200°, 20.693±0.200° and 26.658±0.200°.

In some embodiments of the present disclosure, the X-ray powder diffraction pattern of the crystal form E has characteristic diffraction peaks at the following 2θ angles: 6.675±0.200°, 8.741±0.200°, 11.391±0.200°, 13.762±0.200°, 16.119±0.200°, 17.465±0.200°, 18.097±0.200°, 18.691±0.200°, 19.179±0.200°, 20.693±0.200°, 23.386±0.200° and 26.658±0.200°.

In some embodiments of the present disclosure, the X-ray powder diffraction pattern of the crystal form E has characteristic diffraction peaks at the following 2θ angles: 6.675°, 8.741°, 9.365°, 11.391°, 12.205°, 13.310°, 13.762°, 15.302°, 16.119°, 16.407°, 17.465°, 18.097°, 18.691°, 19.179°, 20.693°, 21.329°, 21.860°, 22.674°, 23.386°, 24.819°, 25.311°, 25.757°, 26.658°, 26.980°, 29.110°, 29.540°, 30.536°, 31.639°, 33.068°, 33.972°, 36.724° and 38.646°.

In some embodiments of the present disclosure, the XRPD pattern of the crystal form E is basically as shown in FIG. 10.

In some embodiments of the present disclosure, the analysis data of the XRPD pattern of the crystal form E is basically as shown in Table 5:

TABLE 5

Analysis data of the XRPD pattern of the crystal form E of the compound of formula (IV-1)

| No. | 2θ (°) | Interplanar Distance (Å) | Relative Strength (%) |
|---|---|---|---|
| 1 | 6.675 | 13.2316 | 32.6 |
| 2 | 8.741 | 10.1076 | 16.6 |
| 3 | 9.365 | 9.4355 | 11.4 |
| 4 | 11.391 | 7.7614 | 16.0 |
| 5 | 12.205 | 7.2458 | 13.3 |
| 6 | 13.310 | 6.6467 | 12.9 |
| 7 | 13.762 | 6.4291 | 26.4 |
| 8 | 15.302 | 5.7855 | 8.6 |
| 9 | 16.119 | 5.4940 | 28.1 |
| 10 | 16.407 | 5.3984 | 14.2 |
| 11 | 17.465 | 5.0736 | 33.1 |
| 12 | 18.097 | 4.8978 | 90.5 |
| 13 | 18.691 | 4.7434 | 100.0 |

TABLE 5-continued

Analysis data of the XRPD pattern of the crystal form E of the compound of formula (IV-1)

| No. | 2θ (°) | Interplanar Distance (Å) | Relative Strength (%) |
|---|---|---|---|
| 14 | 19.179 | 4.6238 | 34.0 |
| 15 | 20.693 | 4.2887 | 41.0 |
| 16 | 21.329 | 4.1625 | 7.8 |
| 17 | 21.860 | 4.0624 | 4.9 |
| 18 | 22.674 | 3.9185 | 6.9 |
| 19 | 23.386 | 3.8007 | 16.4 |
| 20 | 24.819 | 3.5844 | 6.6 |
| 21 | 25.311 | 3.5158 | 14.8 |
| 22 | 25.757 | 3.4559 | 7.1 |
| 23 | 26.658 | 3.3412 | 28.7 |
| 24 | 26.980 | 3.3020 | 6.8 |
| 25 | 29.110 | 3.0651 | 3.8 |
| 26 | 29.540 | 3.0215 | 8.6 |
| 27 | 30.536 | 2.9251 | 4.0 |
| 28 | 31.639 | 2.8256 | 5.8 |
| 29 | 33.068 | 2.7067 | 6.9 |
| 30 | 33.972 | 2.6367 | 3.6 |
| 31 | 36.724 | 2.4451 | 4.8 |
| 32 | 38.646 | 2.3279 | 3.8 |

In some embodiments of the present disclosure, the differential scanning calorimetry curve of the crystal form E has endothermic peaks with an onset at 106.62±3.0° C., 134.32±3.0° C. and 158.33±3.0° C., respectively.

In some embodiments of the present disclosure, the DSC spectrum of the crystal form E is basically as shown in FIG. 11.

In some embodiments of the present disclosure, the thermogravimetric analysis curve of the crystal form E has a weight loss of 6.673% at 150.00° C.±3.0° C.

In some embodiments of the present disclosure, the TGA spectrum of the crystal form E is basically as shown in FIG. 11.

The present disclosure provides a compound of formula (V),

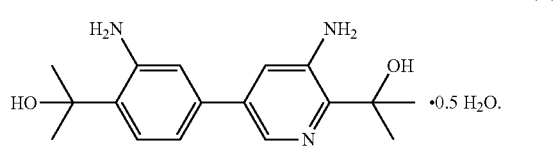

(V)

The present disclosure provides a crystal form F of the compound of formula (V), wherein the crystal form F has an X-ray powder diffraction pattern comprising characteristic diffraction peaks at the following 2θ angles: 14.012±0.200°, 16.936±0.200° and 17.424±0.200°.

In some embodiments of the present disclosure, the X-ray powder diffraction pattern of the crystal form F has characteristic diffraction peaks at the following 2θ angles: 14.012±0.200°, 16.936±0.200°, 17.424±0.200°, 17.954±0.200° and 22.043±0.200°.

In some embodiments of the present disclosure, the X-ray powder diffraction pattern of the crystal form F has characteristic diffraction peaks at the following 2θ angles: 12.567±0.200°, 14.012±0.200°, 15.666±0.200°, 16.936±0.200°, 17.424±0.200°, 17.954±0.200°, 20.717±0.2000 and 22.043±0.200°.

In some embodiments of the present disclosure, the X-ray powder diffraction pattern of the crystal form F has characteristic diffraction peaks at the following 2θ angles: 6.104±0.200°, 12.567±0.200°, 14.012±0.200°, 15.666±0.200°, 16.936±0.200°, 17.424±0.200°, 17.954±0.200°, 20.717±0.200°, 22.043±0.200° and 25.436±0.200°.

In some embodiments of the present disclosure, the X-ray powder diffraction pattern of the crystal form F has characteristic diffraction peaks at the following 2θ angles: 6.104°, 9.825°, 12.567°, 14.012°, 15.666°, 16.936°, 17.424°, 17.954°, 19.298°, 20.717°, 21.106°, 22.043°, 25.436°, 26.230°, 26.94° and 29.721°.

In some embodiments of the present disclosure, the XRPD pattern of the crystal form F is basically as shown in FIG. 12.

In some embodiments of the present disclosure, the analysis data of the XRPD pattern of the crystal form F is basically as shown in Table 6:

TABLE 6

Analysis data of the XRPD pattern of the crystal form F of the compound of formula (V)

| No. | 2θ (°) | Interplanar Distance (Å) | Relative Strength (%) |
| --- | --- | --- | --- |
| 1 | 6.104 | 14.4678 | 12.9 |
| 2 | 9.825 | 8.9946 | 8.3 |
| 3 | 12.567 | 7.0378 | 13.6 |
| 4 | 14.012 | 6.3152 | 35.3 |
| 5 | 15.666 | 5.6521 | 13.5 |
| 6 | 16.936 | 5.2307 | 100.0 |
| 7 | 17.424 | 5.0856 | 72.2 |
| 8 | 17.954 | 4.9366 | 27.4 |
| 9 | 19.298 | 4.5955 | 6.5 |
| 10 | 20.717 | 4.2839 | 14.2 |
| 11 | 21.106 | 4.2058 | 8.6 |
| 12 | 22.043 | 4.0291 | 30.3 |
| 13 | 25.436 | 3.4989 | 11.5 |
| 14 | 26.230 | 3.3947 | 8.5 |
| 15 | 26.940 | 3.3068 | 5.5 |
| 16 | 29.721 | 3.0035 | 7.6 |

In some embodiments of the present disclosure, the differential scanning calorimetry curve of the crystal form F has endothermic peaks with an onset at 83.44±3.0° C. and 154.65±3.0° C., respectively.

In some embodiments of the present disclosure, the DSC spectrum of the crystal form F is basically as shown in FIG. 13.

In some embodiments of the present disclosure, the thermogravimetric analysis curve of the crystal form F has a weight loss of 2.972% at 120.00° C.±3.0° C.

In some embodiments of the present disclosure, the TGA spectrum of the crystal form F is basically as shown in FIG. 13.

The present disclosure further provides a use of the above compound or crystal form A, crystal form B, crystal form C, crystal form D, crystal form E or crystal form F in the preparation of a medicament for treating dry eye.

DEFINITION AND DESCRIPTION

Unless otherwise specified, the following terms and phrases used herein are intended to have the following meanings. A specific phrase or term should not be considered indefinite or unclear in the absence of a particular definition, but should be understood according to the common meaning. When a trade name appears herein, it is intended to refer to its corresponding commercial product or active ingredient thereof.

The intermediate compounds of the present disclosure can be prepared by a variety of synthetic methods known to those skilled in the art, including the specific embodiments listed below, the embodiments formed by their combination with other chemical synthesis methods, and equivalent alternatives known to those skilled in the art, preferred implementations include but are not limited to the embodiments of the present disclosure.

The chemical reactions of the specific embodiments of the present disclosure are completed in a suitable solvent, and the solvent must be suitable for the chemical changes of the present disclosure and the required reagents and materials thereof. In order to obtain the compounds of the present disclosure, sometimes it is necessary for those skilled in the art to modify or select synthetic process or reaction schemes on the basis of existing embodiments.

The structure of the compounds of the present disclosure can be confirmed by conventional methods known to those skilled in the art, and if the present disclosure involves an absolute configuration of a compound, then the absolute configuration can be confirmed by conventional technical means in the art. For example, in the case of single crystal X-ray diffraction (SXRD), the absolute configuration can be confirmed by collecting diffraction intensity data from the cultured single crystal using a Bruker D8 venture diffractometer with CuKα radiation as the light source and scanning mode: φ/scan, and after collecting the relevant data, the crystal structure can be further analyzed by direct method (Shelxs97), and the absolute configuration can be confirmed.

The present disclosure is described in detail by the embodiments below, but it does not mean that there are any restrictions on the present disclosure.

All solvents used in the present disclosure are commercially available and require no further purification.

The solvents used in the present disclosure are commercially available. The following abbreviations are used in the present disclosure: DCM stands for dichloromethane; DMF stands for N,N-dimethylformamide; DMSO stands for dimethylsulfoxide; EtOH stands for ethanol; MeOH stands for methanol.

Technical Effect

The crystal form of the compound of the present disclosure has good stability and is easy to be prepared as a drug; eye drops of the crystal form B of the compound of formula (II) can have good therapeutic effect on the dry eye model of mice induced by scopolamine hydrobromide solution, and it mainly improves tear secretion amount and the condition of corneal damage of mice in the dry eye model; eye drops of the crystal form B of the compound of formula (II) can have good therapeutic effect on the dry eye model of rats induced by hypertonic sodium chloride solution, which mainly improves tear secretion amount, the condition of corneal damage and tear film breakup time of rats in the dry eye model.

X-Ray Powder Diffractometer (XRPD) Method in the Present Disclosure

Instrument model: Bruker D8 Advance X-ray diffractometer

Test method: About 10 mg of sample is used for XRPD test.

The detailed XRPD parameters are as follows:

| | |
| --- | --- |
| Light tube | Copper tube/K-Alpha1 (λ = 1.5418 Å) |
| Voltage | 40 kilovolts (kV) |
| Current | 40 milliamps (mA) |

| | |
|---|---|
| Speed | 15[r/min] |
| Scan range | from 3 to 39.9978[°] |
| Step size | 0.020428946300[°] |
| Time/step(s) | 0.12 [s] |
| Total time | 234.72[s] |

Differential Scanning Calorimeter (DSC) Method in the Present Disclosure

Instrument model: DISCOVERY DSC-2500 Differential Scanning calorimeter

Test method: A sample (0.5 mg to 1 mg) is taken and placed in a DSC aluminum pot for testing. Under the condition of 50 mL/min $N_2$, the sample is heated from room temperature to 250° C. at a heating rate of 10° C./min.

Thermal Gravimetric Analyzer (TGA) Method in the Present Disclosure

Instrument model: DISCOVERY TGA 5500 Thermogravimetric Analyzer

Test method: A sample (2 to 5 mg) is taken and placed in a TGA platinum pot for testing. Under the condition of 25 mL/min $N_2$, the sample is heated from room temperature to 300° C. or with a weight loss of 20% at a heating rate of 10° C./min.

DETAILED DESCRIPTION OF THE PREFERRED EMBODIMENTS

Figure 1:
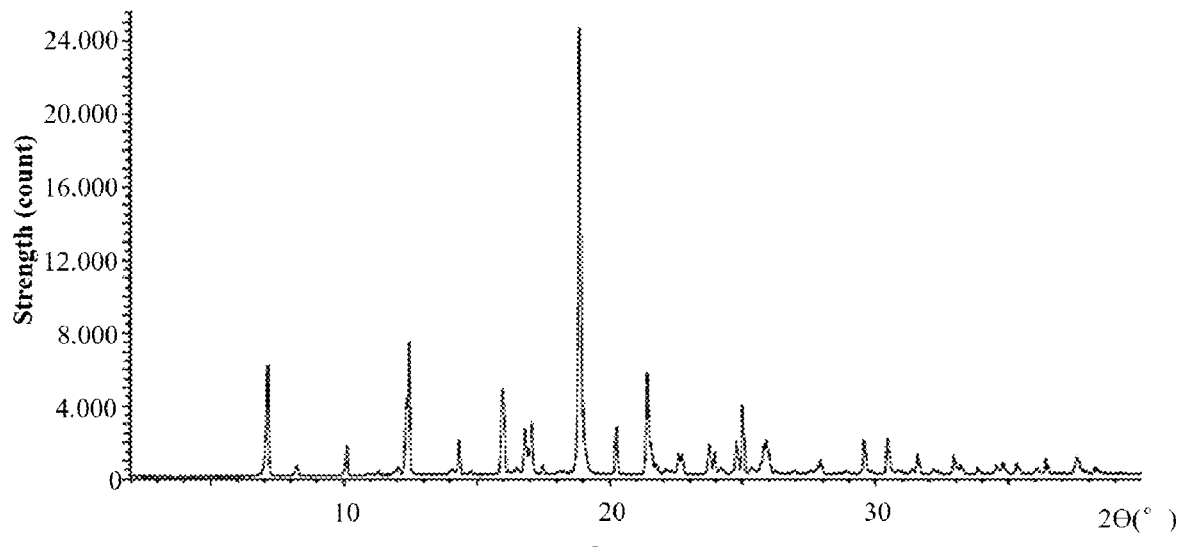
FIG. 1 is the Cu-Kα radiation XRPD pattern of the crystal form A of the compound of formula (I).

In order to better understand the content of the present disclosure, it is further described in conjunction with specific examples, but the specific implementation is not a limitation to the content of the present disclosure.

Example 1: Preparation of Crystal Form B of the Compound of Formula (II)

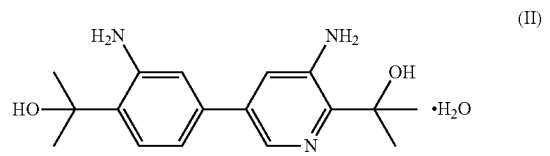

Synthetic Route:

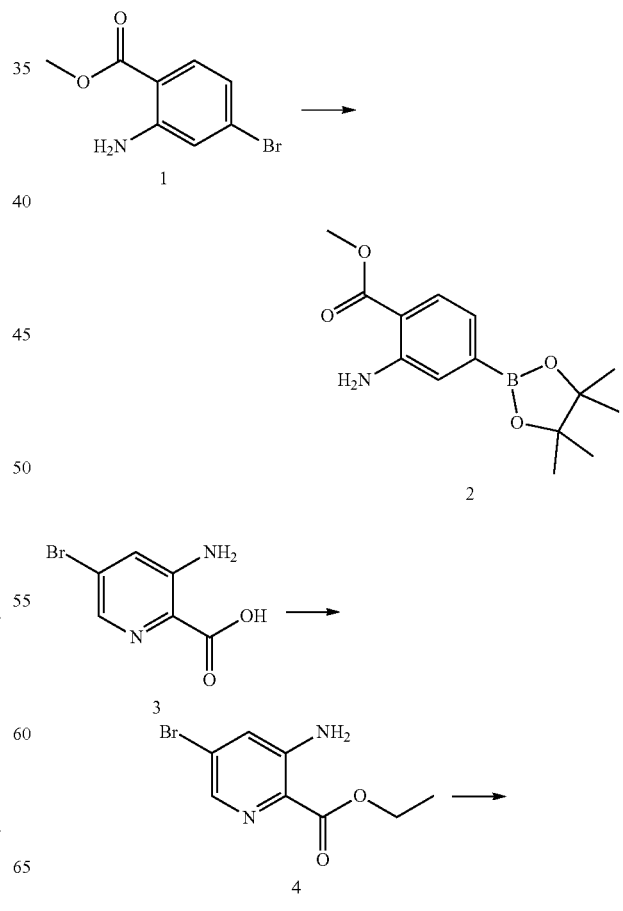

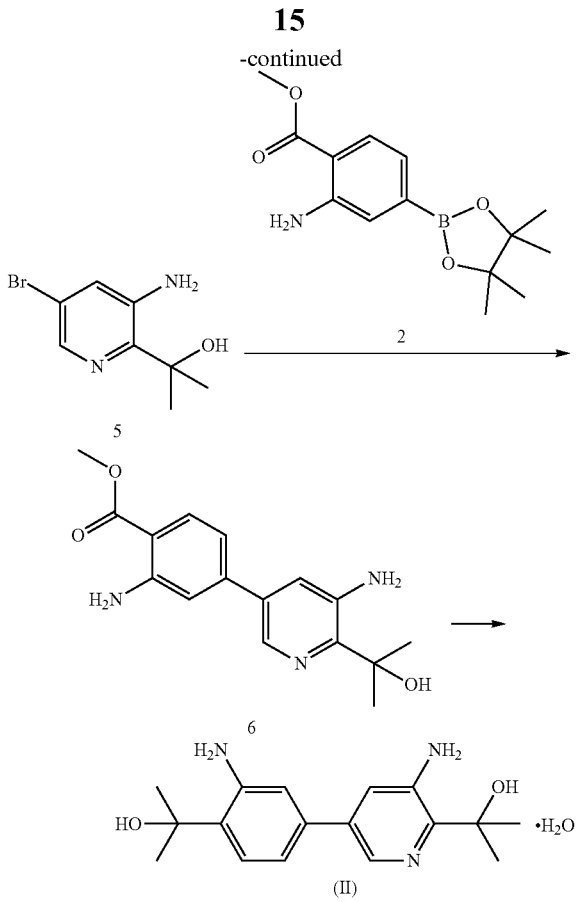

Step 1: Preparation of Compound 2

To toluene (500 mL) was added compound 1 (30 g, 130.4 mmol, 1 eq), bis(pinacolato)diboron (66.23 g, 260.80 mmol, 2 eq), [1,1-bis(diphenylphosphino)ferrocene]-dichloropalladium (II) dichloromethane complex (5.32 g, 6.52 mmol, 0.1 eq) and potassium acetate (25.60 g, 260.80 mmol, 2 eq). After replaced with nitrogen three times, the reaction solution was stirred at 110° C. for 15 hours. After the reaction was completed, the reaction solution was filtered through celite, and the filtrate was concentrated, and the residue was purified by column chromatography (petroleum ether:ethyl acetate=0 to 100:6) to obtain compound 2.

$^1$H NMR (400 MHz, CDCl$_3$) δ 7.84 (d, J=8.0 Hz, 1H), 7.06 (s, 1H), 7.04 (d, J=8.0 Hz, 1H), 5.65 (brs, 2H), 3.87 (s, 3H), 1.35 (s, 12H).

Step 2: Preparation of Compound 4

After compound 3 (100 g, 460.79 mmol, 1 eq) was dissolved in anhydrous ethanol (1 L), concentrated sulfuric acid (225.97 g, 2.30 mol, 122.81 mL, 5 eq) and anhydrous sodium sulfate Na$_2$SO$_4$ (65.45 g, 460.79 mmol, 46.75 mL, 1 eq) were added, and the reaction solution was stirred at 85° C. for 48 hours. After the reaction was completed, the reaction solution was cooled to room temperature. To the reaction solution was added dropwise saturated aqueous sodium bicarbonate solution (1 L), and a large amount of solid was formed. After filtration, the filter cake was washed with water (500 mL), and the obtained solid was dried in vacuum to obtain compound 4.

$^1$H NMR (400 MHz, CDCl$_3$) δ 8.10 (d, J=1.8 Hz, 1H), 7.26 (s, 1H), 4.47 (q, J=7.1 Hz, 2H), 1.46 (t, J=7.2 Hz, 3H).

Step 3: Preparation of Compound 5

Compound 4 (70.00 g, 285.63 mmol, 1 eq) was dissolved in tetrahydrofuran (1 L) and then cooled to −78° C. under nitrogen protection, and to the reaction solution was slowly added dropwise methyllithium (1.6 M, 892.59 mL, 5 eq). The reaction solution was stirred at −78° C. for 3 hours. After the reaction was completed, water (100 mL) was slowly added dropwise to quench the reaction. When warmed to room temperature, the reaction solution was diluted with saturated aqueous solution of ammonium chloride (500 mL) and extracted with ethyl acetate (500 mL*3). The organic phases were combined, dried over anhydrous sodium sulfate, and concentrated under reduced pressure to obtain a crude product. The crude product was slurried with n-heptane (500 mL), filtered and dried to obtain compound 5.

$^1$H NMR (400 MHz, CDCl$_3$) δ 7.86 (d, J=1.9 Hz, 1H), 6.98 (d, J=1.9 Hz, 1H), 4.57 (br s, 2H), 1.57 (s, 6H).

Step 4: Preparation of Compound 6

To dioxane (300 mL) and water (75 mL) was added compound 5 (10 g, 43.27 mmol, 1 eq), compound 2 (23.98 g, 86.55 mmol, 2 eq), [1,1-bis(diphenylphosphino)ferrocene]-dichloropalladium (II) dichloromethane complex (1.77 g, 2.16 mmol, 0.05 eq) and cesium carbonate (28.20 g, 86.55 mmol, 2 eq). After replaced with nitrogen three times, the reaction solution was stirred at 80° C. for 5 hours. After the reaction was completed, the reaction solution was concentrated, and the residue was purified by column chromatography (petroleum ether: tetrahydrofuran=0 to 100:40) to obtain crude compound 6. The crude product was heated to 80° C. with tetrahydrofuran (4 mL/g), then cooled to recrystallize. The solution was stirred at 25° C. for 15 hours, filtered, and the filter cake was dried to obtain compound 6.

$^1$H NMR (400 MHz, DMSO-d$_6$) δ 7.94 (d, J=2.0 Hz, 1H), 7.77 (d, J=8.0 Hz, 1H), 7.17 (d, J=2.0 Hz, 1H), 6.99 (d, J=1.6 Hz, 1H), 7.77-7.75 (m, 3H), 5.69 (s, 2H), 5.50 (s, 1H), 3.81 (s, 3H), 1.52 (s, 6H).

Step 5: Preparation of the Compound of Formula (I)

Compound 6 (8.78 g, 29.14 mmol, 1 eq) was dissolved in tetrahydrofuran (80 mL), and cooled to 0° C. under nitrogen protection. To the reaction solution was added dropwise methylmagnesium bromide (3 M, 97.12 mL, 10 eq), and the reaction solution was stirred at 0° C. for 1 hour. After completion of the reaction, saturated aqueous solution of ammonium chloride (400 mL) was slowly added to quench the reaction, then the reaction solution was extracted with ethyl acetate (400 mL*2). The organic phase was concentrated under reduced pressure, and the residue, i.e. the crude product was purified by dichloromethane (3 mL/g) at 25° C., filtered and dried to obtain the product.

$^1$H NMR (400 MHz, DMSO-d$_6$) δ 7.88 (d, J=1.8 Hz, 1H), 7.15-7.01 (m, 2H), 6.82 (d, J=1.6 Hz, 1H), 6.69 (dd, J=1.5, 8.0 Hz, 1H), 5.59 (br s, 2H), 5.51 (br s, 2H), 5.44 (s, 1H), 5.23 (s, 1H), 1.51 (d, J=3.6 Hz, 12H).

11.9 g of the above product was added into a round-bottomed flask, and 150 mL of methyl tert-butyl ether was added. The above sample was stirred at 50° C. for 12 hours, then cooled down to 25° C. and stirred for 4 hours. After filtration and drying, a solid was obtain. It was detected as the crystal form A by XRPD.

About 50 mg of the crystal form A was added into a 2.0 mL glass vial, and an appropriate amount of solvent or solvent mixture was added to make it into a suspension. After a magnetic stir bar was added, the above sample was placed on a magnetic heating stirrer (25° C./50° C.) and stirred for a week, and after centrifugation, the obtained solid sample was placed in a vacuum oven at 40° C. and dried overnight to obtain the crystal form B of the compound of formula (II).

| No. | Solvent | Volume Ratio | Crystal Form |
|---|---|---|---|
| 1 | Water | / | Crystal Form B |
| 2 | Acetonitrile/Water | 3/1 | Crystal Form B |
| 3 | Methanol/Water | 3/1 | Crystal Form B |
| 4 | Tetrahydrofuran/Water | 3/1 | Crystal Form B |
| 5 | Ethanol/Water | 3/1 | Crystal Form B |
| 6 | Isopropanol/Water | 3/1 | Crystal Form B |

Example 2: Confirmation of the Structure of the Compound of Formula (II)

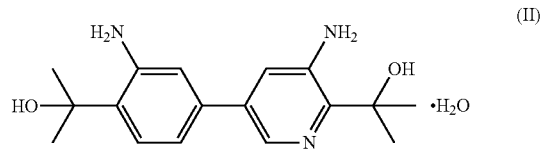
(II)

Process of cultivation of single crystal: About 5 mg crystal form B of the compound of formula (II) was dissolved in 3 mL of dichloromethane/methanol (2:1) at room temperature. The sample solution was placed in a 4 mL semi-sealed sample vial and evaporated slowly at room temperature. Colorless transparent crystals were obtained on the 5th day. The crystal size used for diffraction experiments was: 0.20×0.18×0.15 mm$^3$.

Single crystal diffraction instrument: Bruker D8 venture

Figure 14:
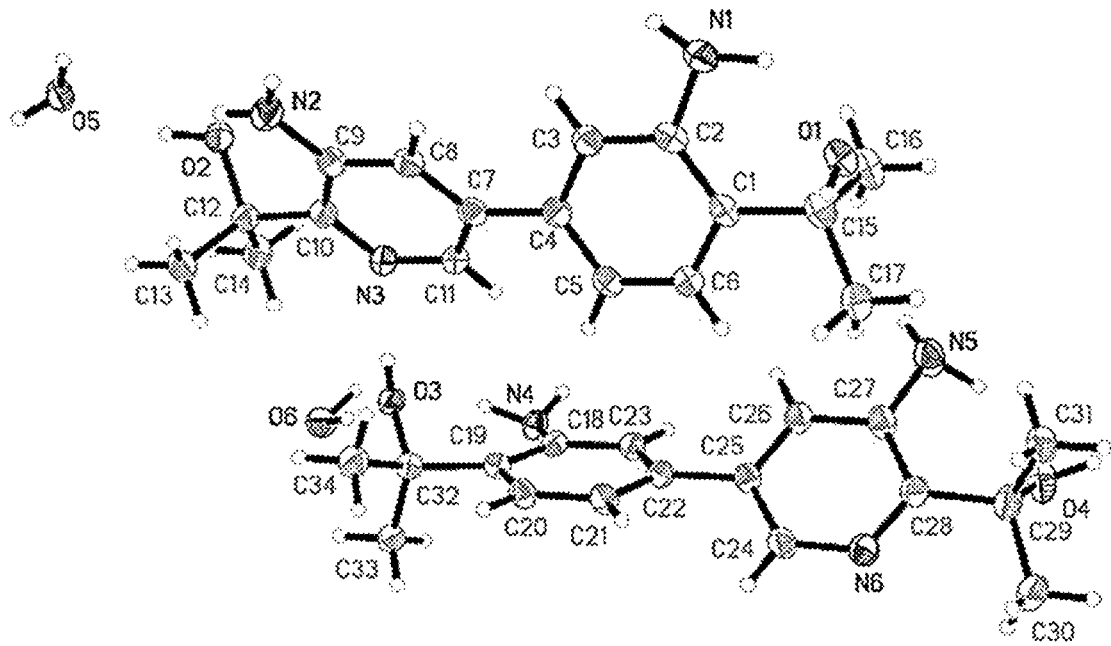
FIG. 14 is a three-dimensional structural ellipsoid plot of the crystal form B of the compound of formula (II).

The information of the measured compound was: molecular formula $C_{17}H_{25}N_3O_3$, crystal system Monoclinic, space group C2/c, unit cell parameters a=20.6603(14) Å, b=15.6554(14) Å, c=21.0124(16) Å, β=90.01°, α=γ=90°, volume V=6796.4(9) Å$^3$. FIG. 14 was a three-dimensional structural ellipsoid plot of the crystal form B of the compound of formula (II). At the same time, the crystal form of the single crystal was measured and confirmed to be crystal form B.

Example 3: Preparation of Each Crystal Form

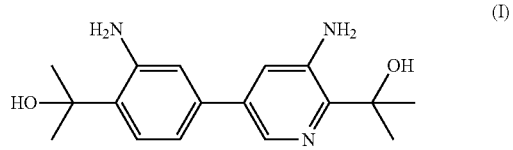
(I)

About 50 mg of the crystal form A was added into a 2.0 mL glass vial, and an appropriate amount of methanol or ethanol was added to make it into a suspension. After a magnetic stir bar was added, the above sample was placed on a magnetic heating stirrer (50° C.) and stirred for a week, and after centrifugation, the obtained solid sample was placed in a vacuum oven at 40° C. and dried overnight to obtain the crystal form C of the compound of formula (I).

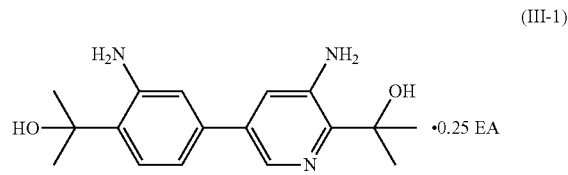 [SMILES: CC(C)(O)c1ccc(-c2cnc(C(C)(C)O)c(N)c2)cc1N]
(III-1)

Figure 15:
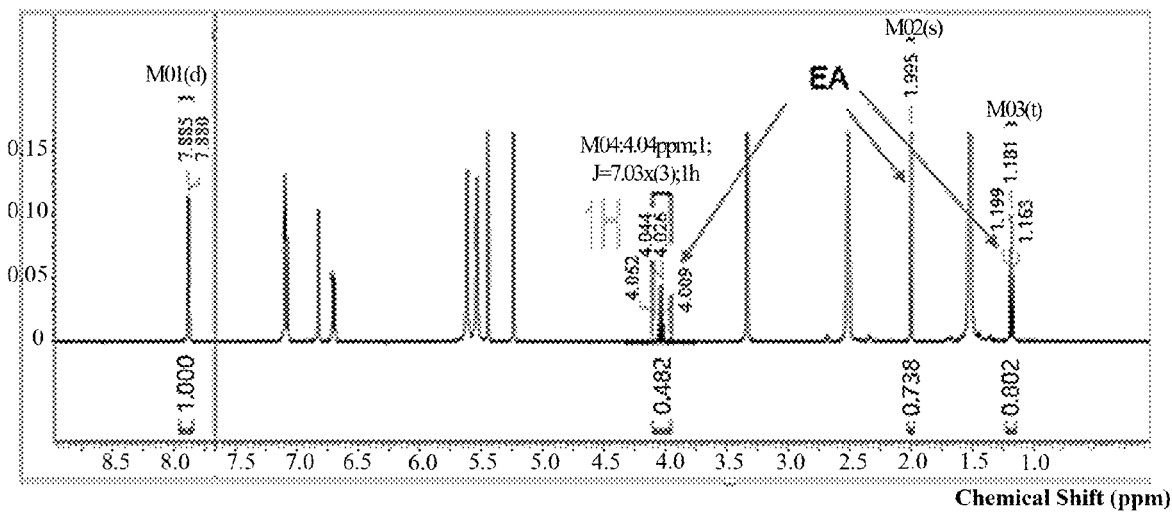
FIG. 15 is the nuclear magnetic spectrum of the crystal form D of the compound of formula (III-1).

About 50 mg of the crystal form A was added into a 2.0 mL glass vial, and an appropriate amount of ethyl acetate was added to make it into a suspension. After a magnetic stir bar was added, the above sample was placed on a magnetic heating stirrer (25° C./50° C.) and stirred for a week, and after centrifugation, the obtained solid sample was placed in a vacuum oven at 40° C. and dried overnight to obtain the crystal form D of the compound of formula (III-1). NMR data were shown in FIG. 15.

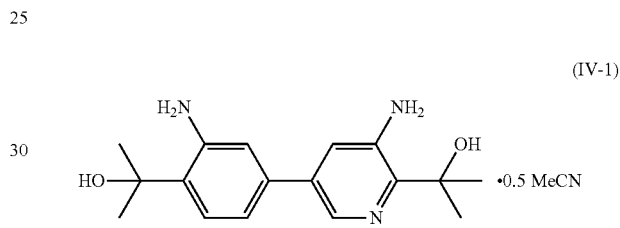
(IV-1)

Figure 16:
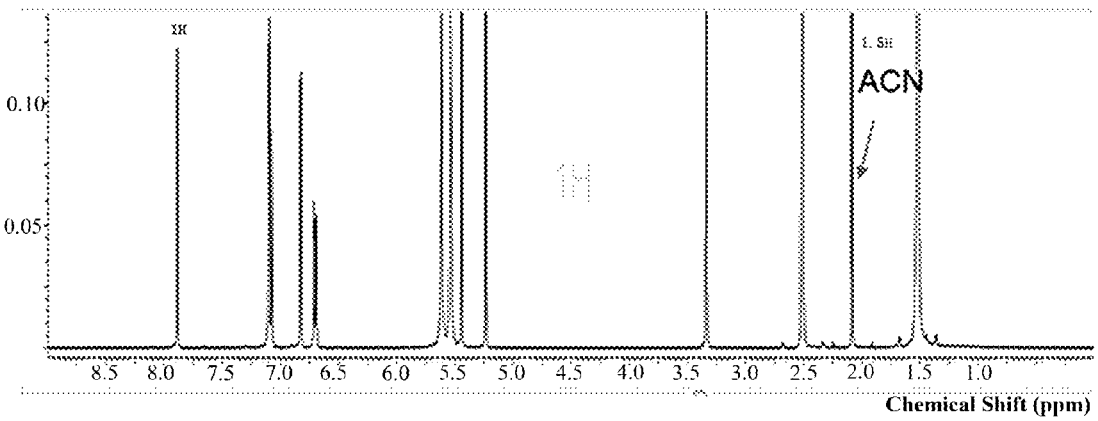
FIG. 16 is the nuclear magnetic spectrum of the crystal form E of the compound of formula (IV-1).

About 50 mg of the crystal form A was added into a 2.0 mL glass vial, and an appropriate amount of acetonitrile was added to make it into a suspension. After a magnetic stir bar was added, the above sample was placed on a magnetic heating stirrer (25° C./50° C.) and stirred for a week, and after centrifugation, the obtained solid sample was placed in a vacuum oven at 40° C. and dried overnight to obtain the crystal form E of the compound of formula (IV-1). NMR data were shown in FIG. 16.

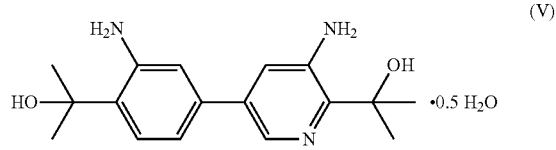
(V)

About 50 mg of the crystal form A was added into a 2.0 mL glass vial, and an appropriate amount of dichloromethane was added to make it into a suspension. After a magnetic stir bar was added, the above sample was placed on a magnetic heating stirrer (25° C.) and stirred for a week, and after centrifugation, the obtained solid sample was placed in a vacuum oven at 40° C. and dried overnight to obtain the crystal form F of the compound of formula (V).

Example 4: Pre-Stability Experiment of the Crystal Form B of the Compound of Formula (II)

About 50 mg of the crystal form B of the compound of formula (II) was accurately weighed, placed in a dry and clean glass bottle, spread into a thin layer as the tested sample, respectively, and placed under the test condition of influencing factors (40° C., 25° C./92.5% RH, light, light control) and accelerated condition (40° C./75% RH and 60° C./75% RH). The samples were fully exposed. Samples under the test condition of 40° C., 25° C./92.5% RH, light, light control were taken at 5 days and 10 days for analysis, and samples under the accelerated condition were taken at 1 month, 2 months and 3 months for analysis.

| Experimental Conditions | Sampling Time | Crystal Form |
| --- | --- | --- |
| 40° C. (open) | 10 days | Crystal Form B |
|  | 1 month | Crystal Form B |
| 25° C./92.5% RH (open) | 5 days | Crystal Form B |
|  | 10 days | Crystal Form B |
| Samples under light (visible light intensity 5000 lux and ultraviolet intensity 90 W/cm$^2$, open) | 10 days | Crystal Form B |
| light control | (10 days) | Crystal Form B |
| 40° C./75% RH (open) | 1 month | Crystal Form B |
|  | 2 month | Crystal Form B |
|  | 3 month | Crystal Form B |
| 60° C./75% RH (open) | 1 month | Crystal Form B |
|  | 2 month | Crystal Form B |
|  | 3 month | Crystal Form B |

Experimental conclusion: The crystal form B of the compound of formula (II) was placed under the test condition of the influencing factor (40° C., 25° C./92.5% RH, light, light control) for 10 days, 40° C. for 1 month, long-term accelerated condition (40° C./75% RH and 60° C./75% RH) for 3 months, and the crystal form was stable.

Example 5: 25° C. Competition Experiment of Water Activity of the Crystal Form B of the Compound of Formula (II) and Crystal Form C of the Compound of Formula (I)

About 15 mg of the crystal form C of the compound of formula (I) was weighed respectively, and an appropriate amount of solvent system was added at room temperature to form a saturated solution. If the solution was clear, the compound was continued to add until the solution was saturated. The solution was filtered into the liquid phase vial through a 0.45 μm nylon needle filter, and then to the liquid phase vial was added almost equal amounts of the crystal form B of the compound of formula (II) and crystal form C of the compound of formula (I) to make a suspension liquid. After addition of a magnetic stir bar, the above suspension sample was placed on a constant temperature mixer (25° C., 700 rpm) for shaking.

| Solvent (Ethanol:Water) | Water Activity | Time for Suspension and Beating (Days) | XRPD |
| --- | --- | --- | --- |
| Pure Ethanol | 0 | 3 | Crystal Form C |
|  |  | 5 | Crystal Form C |
| 95:5 | 0.3 | 3 | Crystal Form B |
|  |  | 5 | Crystal Form B |
| 90:10 | 0.5 | 3 | Crystal Form B |
|  |  | 5 | Crystal Form B |
| 80:20 | 0.7 | 3 | Crystal Form B |
|  |  | 5 | Crystal Form B |
| 50:50 | 0.9 | 3 | Crystal Form B |
|  |  | 5 | Crystal Form B |
| Pure Water | 1.0 | 3 | Crystal Form B |
|  |  | 5 | Crystal Form B |

The results showed that: the crystal form B of the compound of formula (II) and the crystal form C of the compound of formula (I) were suspended and beaten for 5 days under the condition of water activity of 0, and the crystal form C of the compound of formula (I) was obtained. However, with the increase of water activity, after 5 days of suspension and beating, the crystal form obtained were all the crystal form B of the compound of formula (II). And the products obtained with water activity of 0.9 and 1.0 were characterized after drying, and the two were almost the same. Therefore, the crystal form B of the compound of formula (II) was more stable than the crystal form C of the compound of formula (I).

Biological Test Data

Example 1: Experimental Study on the Effect of Eye Drops of the Crystal Form B of the Compound of Formula (II) on Dry Eye Models of Mice Experimental Purpose:

The C57BL/6 dry eye model of mice was induced by subcutaneous injection of scopolamine hydrobromide solution in lower limbs to investigate the therapeutic effect of the eye drops of the crystal form B of the compound of formula (II) on the model.

Experiment Procedure:

According to the tear secretion amount, the animals were randomly and evenly divided into 5 groups, which were negative control group (normal saline), model control group (vehicle), low (1 mg/mL), medium (2.5 mg/mL) and high (5 mg/mL) concentration groups for the crystal form B of the compound of formula (II), with 8 animals in each group, all female. The grouping day was recorded as D0. After divided into groups, Animals in each group were subjected to modeling, eye drop administration, scoring of corneal fluorescent staining, tear secretion measurement, etc., according to the experimental settings.

Figure 17:
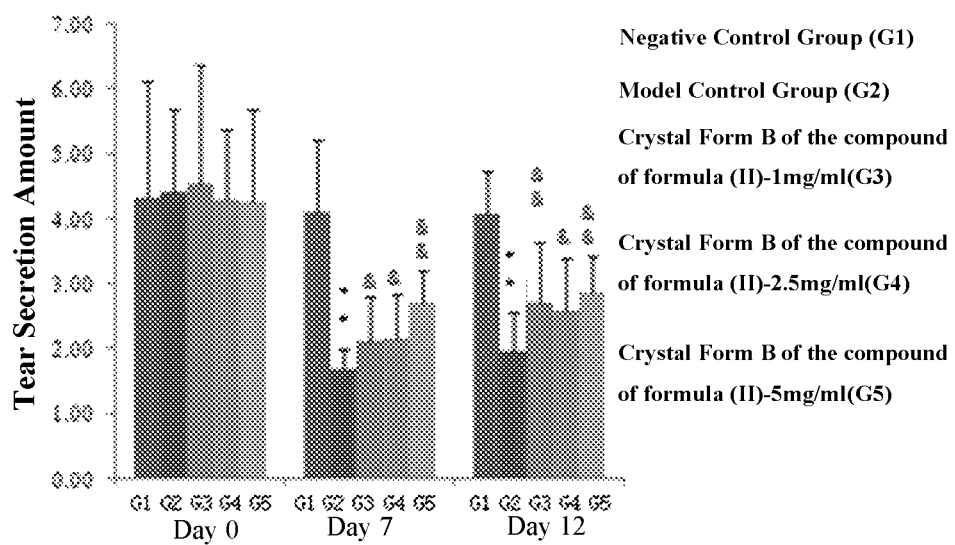
FIG. 17 shows the tear secretion amount of animals in the scopolamine dry eye model of mice.
Figure 18:
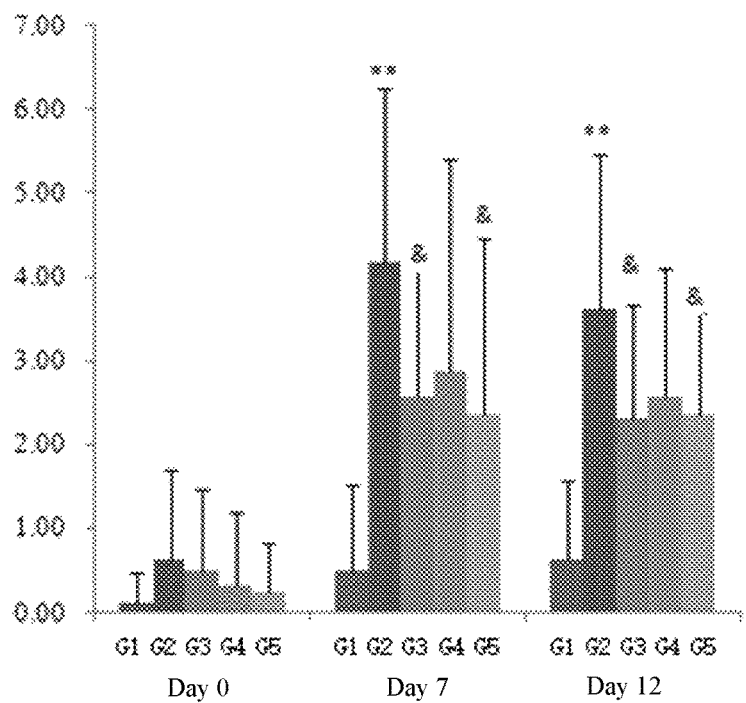
FIG. 18 shows the fluorescent staining of the cornea of animals in the scopolamine dry eye model of mice.

Experimental Results:

The solution of the crystal form B of the compound of formula (II) (1 mg/mL, 2.5 mg/mL, 5 mg/mL) had good therapeutic effect on the dry eye model of mice induced by scopolamine hydrobromide solution, which mainly improved tear secretion amount and corneal damage of mouse in dry eye model. Combining the tear secretion amount (Table 7, FIG. 17) and the scoring of corneal fluorescent staining (Table 8, FIG. 18), it was concluded that eye drops of the crystal form B of the compound of the formula (II) had the best therapeutic effect at a concentration of 5 mg/mL.

TABLE 7

Effect of the solution of the crystal form B of the compound of formula (II) on tear secretion amount of mice in the dry eye models ($\bar{x} \pm S$)

| | Wetted length of phenol red cotton thread (mm) | | |
|---|---|---|---|
| Group | D0 | D7 | D12 |
| Negative control group (G1) | 4.33 ± 1.78 | 4.10 ± 1.12 | 4.07 ± 0.66 |
| Model control group (G2) | 4.41 ± 1.29 | 1.70 ± 0.30##** | 1.97 ± 0.59##** |
| 1 mg/mL group (G3) of the crystal form B of the compound of formula II | 4.54 ± 1.84 | 2.13 ± 0.69##& | 2.72 ± 0.91##&& |
| 2.5 mg/mL group (G4) of the crystal form B of the compound of formula II | 4.30 ± 1.08 | 2.14 ± 0.69##& | 2.58 ± 0.82##& |
| 5 mg/mL group (G5) of the crystal form B of the compound of formula II | 4.28 ± 1.41 | 2.73 ± 0.48##&& | 2.85 ± 0.57##&& |

Note:
Compared with D0, #$P < 0.05$; ##$P < 0.01$; compared with G1 group, *$P < 0.05$; **$P < 0.01$; compared with G2 group, &$P < 0.05$; &&$P < 0.01$.

TABLE 8

Effect of the solution of the crystal form B of the compound of formula (II) on the scoring of cornea fluorescent staining of mice in the dry eye models ($\bar{x} \pm S$)

| | Scoring of fluorescent staining of the cornea | | |
|---|---|---|---|
| Group | D0 | D7 | D12 |
| Negative control group (G1) | 0.13 ± 0.34 | 0.50 ± 1.03 | 0.63 ± 0.96# |
| Model control group (G2) | 0.63 ± 1.09 | 4.19 ± 2.07##** | 3.63 ± 1.82##** |
| 1 mg/mL group (G3) of the crystal form B of the compound of formula II | 0.50 ± 0.97 | 2.56 ± 1.50##& | 2.31 ± 1.35##& |
| 2.5 mg/mL group (G4) of the crystal form B of the compound of formula II | 0.31 ± 0.87 | 2.88 ± 2.53##** | 2.56 ± 1.55##** |
| 5 mg/mL group (G5) of the crystal form B of the compound of formula II | 0.25 ± 0.58 | 2.38 ± 2.09##& | 2.38 ± 1.20##& |

Note:
Compared with D0, #$P < 0.05$; ##$P < 0.01$; compared with G1 group, *$P < 0.05$; **$P < 0.01$; compared with G2 group, &$P < 0.05$; &&$P < 0.01$.

Experimental Results:

The eye drops of the crystal form B of the compound of formula (II) had good therapeutic effect on the dry eye model of mice induced by scopolamine hydrobromide solution, which mainly improved tear secretion amount and corneal damage of mouse in dry eye model.

Example 2: Experimental Study on the Effect of Eye Drops of the Crystal Form B of the Compound of Formula (II) on Hyperosmola Dry Eye Models of Rats 20 female SD rats qualified for the adaptability observation were subjected to the scoring of fluorescent staining of the cornea and measurement of tear secretion amount of both eyes for the animals, and animals with abnormalities of problematic fluorescent staining of the cornea and significant differences in tear secretion amount were excluded.

A pipette was used to draw 20 μL of sodium chloride solution (osmotic pressure of 500 mOsmol/L), which was dropped into the conjunctival sac of both eyes of the animal, 5 times/day, 20 μL/time, with an interval of about 2 hours between each time, for 28 consecutive days. After dropping the solution, the animal's eyelids were passively closed for about 90 s. On the 14th day of the modeling period, the animals were subjected to scoring of fluorescent staining of the cornea of both eyes and measurement of tear secretion amount, and the data were compared with the basic data, and the animals with significant differences in tear secretion amount of both eyes were selected for grouping. Animals were randomly and evenly divided into 4 groups according to the average of tear secretion amount of both eyes, namely the model control group, low and high concentration groups (1 mg/mL, 5 mg/mL) of the crystal form B of the compound of formula (II), with 4 animals in each group and 8 eyes, and the grouping day was recorded as D0.

Animals in each group were administered eye drops at D1, 10 μL/eye/time, 4 times/day, with an interval of about 3 hours between administrations, for a total of 14 days and weighed once a week during the administration period. About 30 minutes after the second administration on D7 and D14 respectively, the tear secretion amount of both eyes was measured, and the scoring of fluorescent staining of the cornea was performed about 30 minutes after the third administration on D7 and D14. The animals were euthanized by carbon dioxide inhalation after the measurement of D14 indicators.

Figure 19:
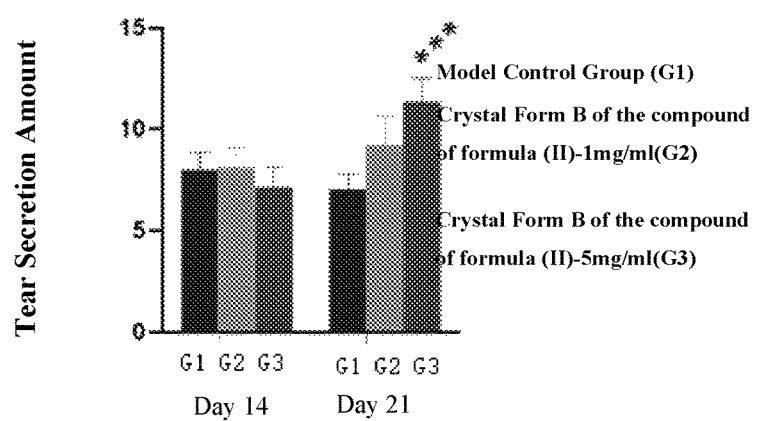
FIG. 19 shows the tear secretion amount of animals in the hyperosmolar dry eye model of rats.
Figure 20:
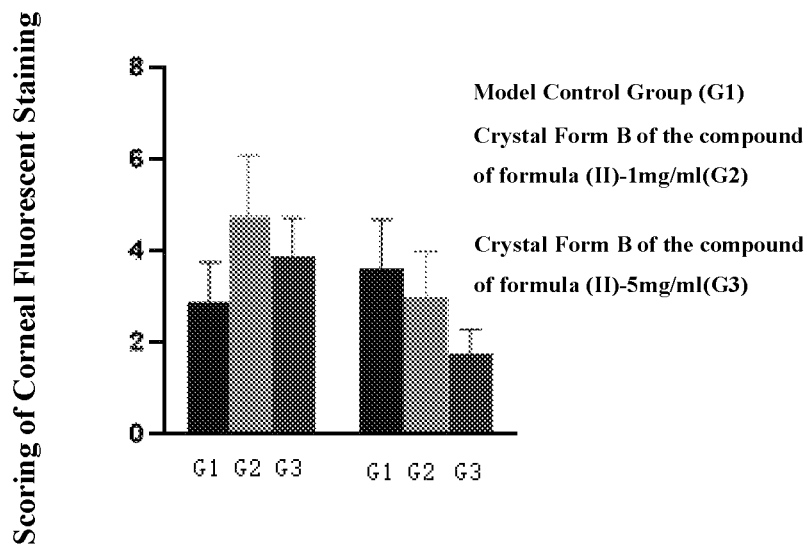
FIG. 20 shows the fluorescent staining of the cornea of animals in the hyperosmolar dry eye model of rat.
Figure 21:
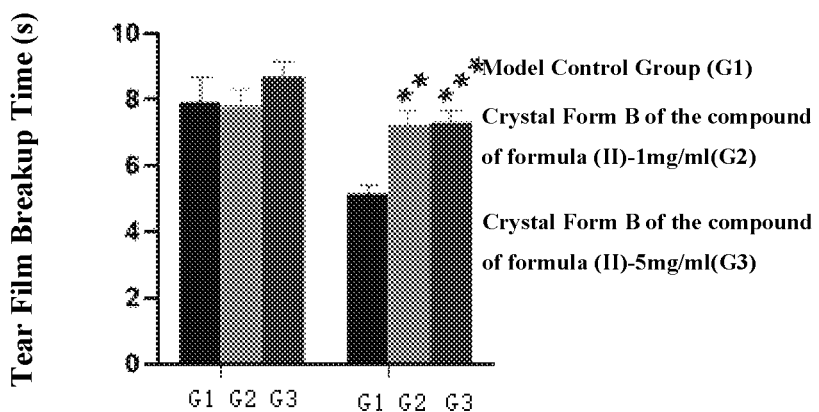
FIG. 21 shows the tear film breakup time of animals in the hyperosmolar dry eye model of rats.

Experimental results: See Tables 9 and 10 and FIGS. 19, 20 and 21.

TABLE 9

Effect of the solution of the crystal form B of the compound of formula (II) on tear secretion amount in rats of the dry eye model ($\bar{x} \pm S$)

| Group | Wetted length of phenol red cotton thread (mm) | | |
|---|---|---|---|
| | D0 | D14 | D21 |
| Model control group (G1) | 12.31 ± 3.22 | 7.98 ± 2.53 | 7.05 ± 2.08 |
| 1 mg/mL group (G2) of the crystal form B of the compound of formula II | 13.78 ± 5.25 | 8.12 ± 2.81 | 9.24 ± 4.07 |
| 5 mg/mL group (G3) of the crystal form B of the compound of formula II | 13.87 ± 4.45 | 7.16 ± 2.77 | 11.37 ± 3.26** |

Note:
Compared with G1 group, *P < 0.05; **P < 0.01.

TABLE 10

Effect of the solution of the crystal form B of the compound of formula (II) on the assessment of fluorescein staining of the cornea in rats of the dry eye model ($\bar{x} \pm S$)

| Group | Scoring of fluorescent staining of the cornea | | |
|---|---|---|---|
| | D0 | D14 | D21 |
| Model control group (G1) | 0.38 ± 0.52 | 2.88 ± 2.47 | 3.63 ± 2.97 |
| 1 mg/mL group (G2) of the crystal form B of the compound of formula II | 0.00 ± 0.00 | 4.75 ± 3.73 | 3.00 ± 2.78 |
| 5 mg/mL group (G3) of the crystal form B of the compound of formula II | 0.13 ± 0.35 | 3.88 ± 2.36 | 1.75 ± 1.49 |

Note:
Compared with G1 group, *P < 0.05; **P < 0.01.

Experimental conclusion: The eye drops of the crystal form B of the compound of formula (II) had good therapeutic effect on the dry eye model of rat induced by hypertonic sodium chloride solution, which mainly improved tear secretion amount, corneal damage and tear film breakup time of rat in dry eye model.

What is claimed is:

1. A crystal form B of a compound of formula (II), wherein the crystal form B has an X-ray powder diffraction pattern comprising characteristic diffraction peaks at the following 2θ angles: 8.231±0.200°, 17.058±0.200° and 18.955±0.200°,

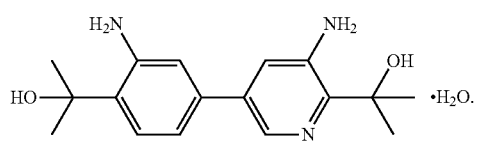

2. The crystal form B according to claim 1, wherein the X-ray powder diffraction pattern thereof has characteristic diffraction peaks at the following 2θ angles: 8.231±0.200°, 17.058±0.200°, 18.955±0.200°, 21.712±0.200° and 25.678±0.200°.

3. The crystal form B according to claim 2, wherein the X-ray powder diffraction pattern thereof has characteristic diffraction peaks at the following 2θ angles: 8.231±0.200°, 12.068±0.200°, 16.505±0.200°, 17.058±0.200°, 18.955±0.200°, 21.712±0.200°, 24.242±0.200° and 25.678±0.200°.

4. The crystal form B according to claim 3, wherein the X-ray powder diffraction pattern thereof has characteristic diffraction peaks at the following 2θ angles: 7.083±0.200°, 8.231±0.200°, 11.294±0.200°, 12.068±0.200°, 14.091±0.200°, 16.505±0.200°, 17.058±0.200°, 18.955±0.200°, 21.712±0.200°, 24.242±0.200°, 25.678±0.200° and 30.869±0.200°.

5. The crystal form B according to claim 4, wherein the X-ray powder diffraction pattern thereof has characteristic diffraction peaks at the following 2θ angles: 7.083°, 8.231°, 11.294°, 12.068°, 14.091°, 14.806°, 16.505°, 17.058°, 18.202°, 18.955°, 21.712°, 22.182°, 23.903°, 24.242°, 24.653°, 25.3500, 25.678°, 26.270°, 27.001°, 27.658°, 29.052°, 29.721°, 30.869°, 34.644° and 35.009°.

Figure 3:
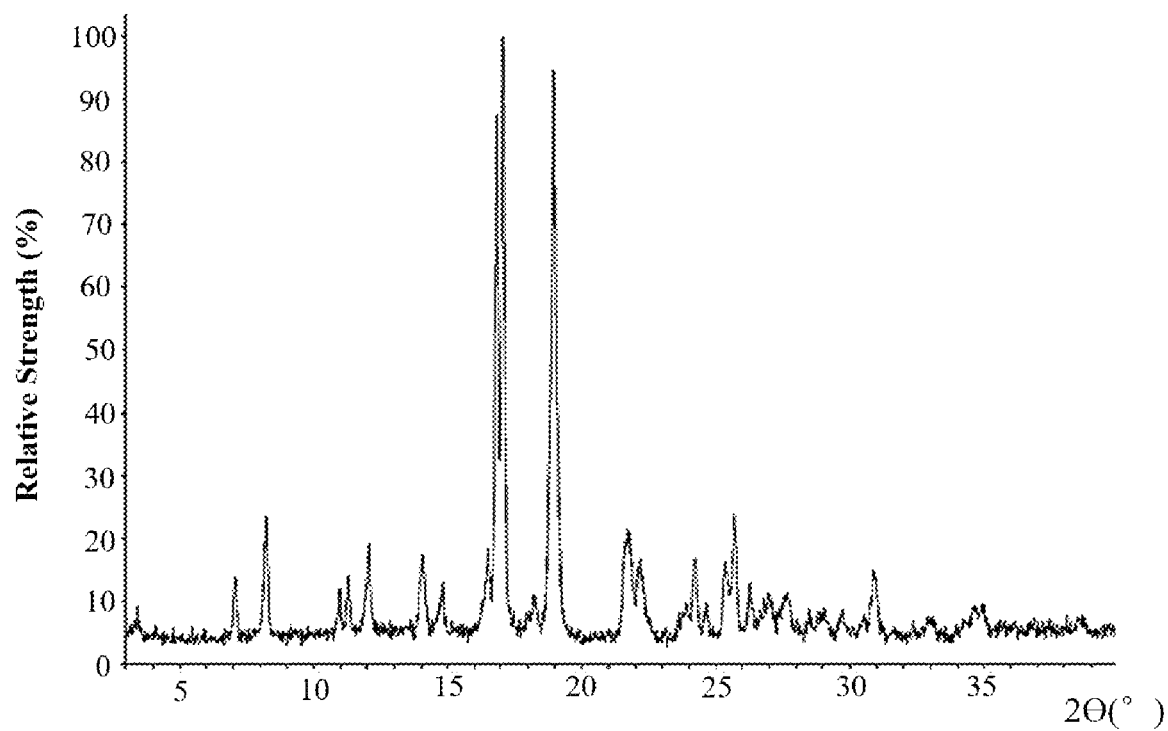
FIG. 3 is the Cu-Kα radiation XRPD pattern of the crystal form B of the compound of formula (II).

6. The crystal form B according to claim 5, wherein the XRPD pattern thereof is as shown in FIG. 3.

7. The crystal form B according to claim 1, wherein the differential scanning calorimetry curve thereof has endothermic peaks with an onset at 101.7±3.0° C. and 158.7±3.0° C., respectively;

or, the thermogravimetric analysis curve thereof has a weight loss of 5.477% at 120.00° C.±3.0° C.

Figure 4:
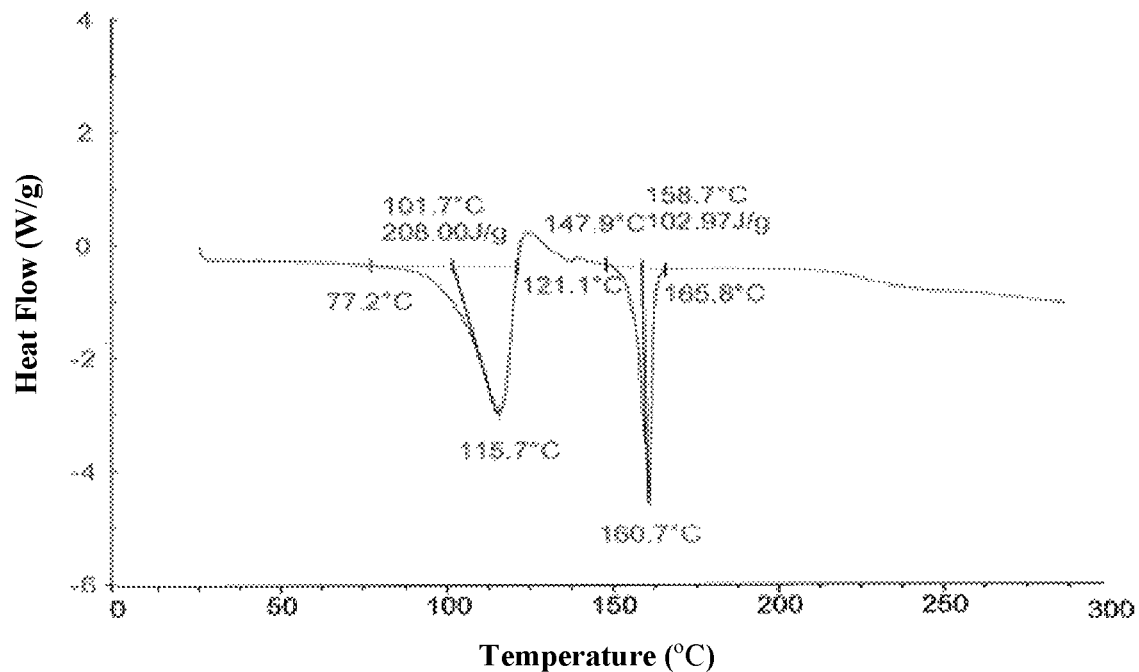
FIG. 4 is the DSC spectrum of the crystal form B of the compound of formula (II).
Figure 5:
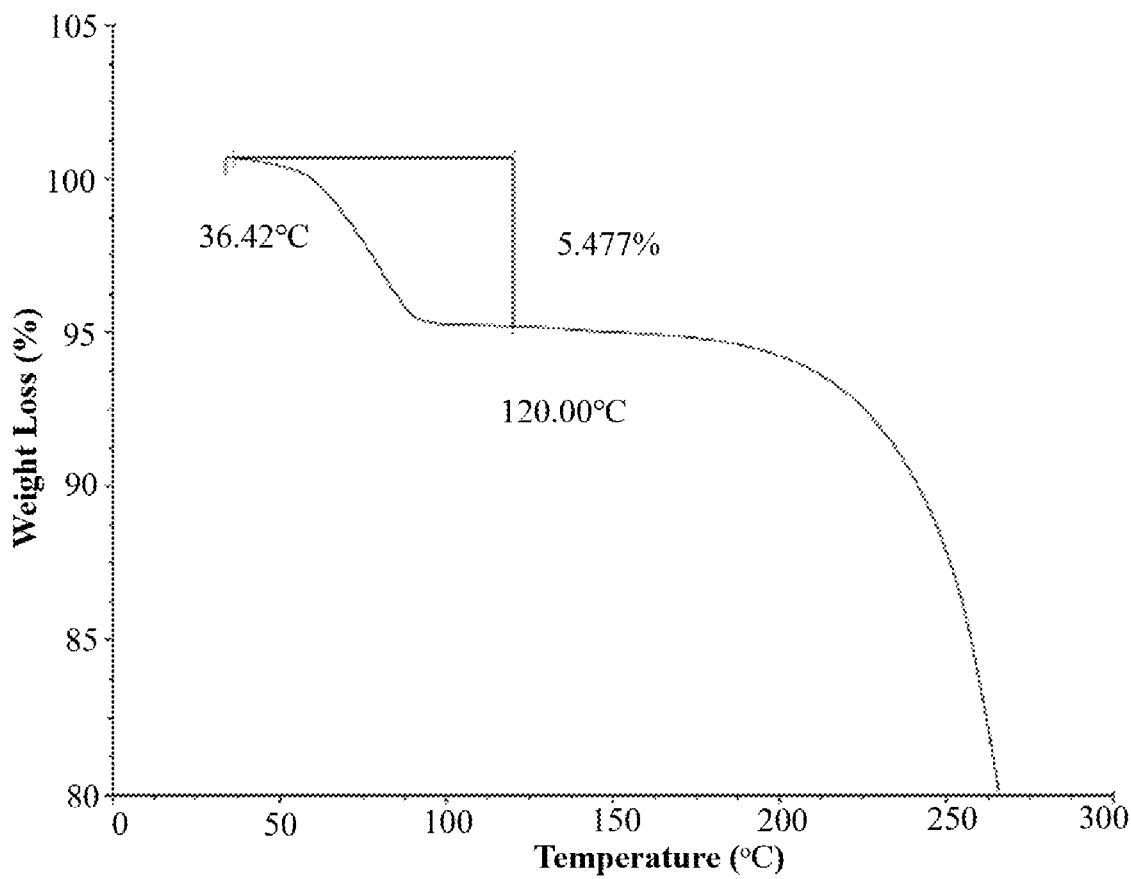
FIG. 5 is a TGA spectrum of the crystal form B of the compound of formula (II).

8. The crystal form B according to claim 7, wherein the DSC spectrum thereof is as shown in FIG. 4;

or, the TGA spectrum thereof is as shown in FIG. 5.

9. A method for treating dry eye in a subject in need thereof, comprising administering to the subject an effective amount of the crystal form B according to claim 1.

10. A compound of formula (II),

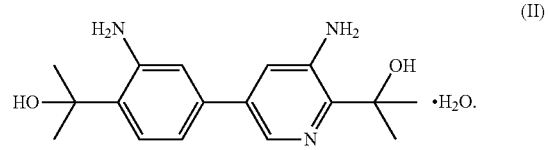

11. A compound, of formula (III), formula (IV) or formula (V):

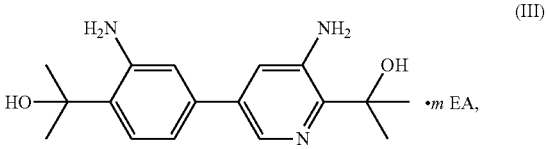

m is selected from 0 to 1;

or,

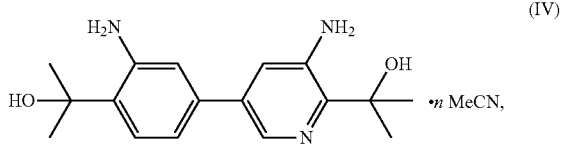 [SMILES: CC(C)(O)c1ccc(-c2cnc(C(C)(C)O)c(N)c2)cc1N]

n is selected from 0 to 1;

or,

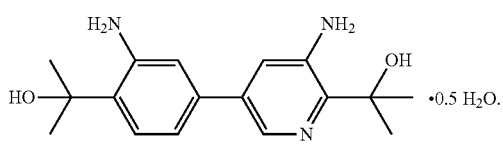

(V)   •0.5 H₂O.

12. The compound according to claim 11, wherein the compound of formula (III) is the compound of formula (III-1),

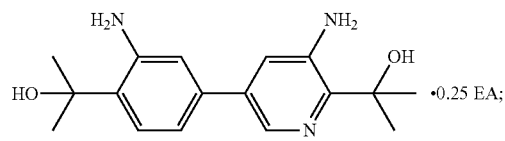

(III-1)   •0.25 EA;

or, the compound of formula (IV) is the compound of formula (IV-1),

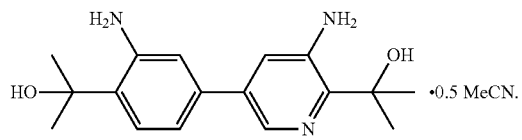

(IV-1)   •0.5 MeCN.

13. A crystal form, wherein the crystal form is
a crystal form A of a compound of formula (I), wherein the crystal form A has an X-ray powder diffraction pattern comprising characteristic diffraction peaks at the following 2θ angles: 7.14±0.20°, 12.46±0.20° and 18.87±0.20°,

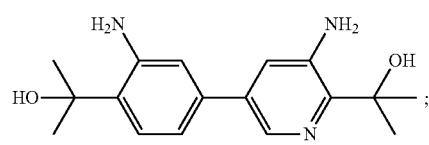

(I) ;

or,
a crystal form C of a compound of formula (I), wherein the crystal form C has an X-ray powder diffraction pattern comprising characteristic diffraction peaks at the following 2θ angles: 12.871±0.200°, 17.488±0.200° and 19.079±0.200°,

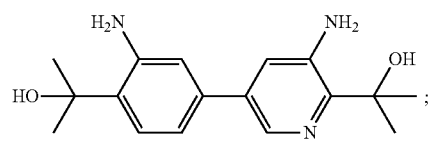

(I) ;

or,
a crystal form D of the compound of formula (III-1) according to claim 12, wherein the crystal form D has an X-ray powder diffraction pattern comprising characteristic diffraction peaks at the following 2θ angles: 6.600±0.200°, 17.775±0.200° and 19.138±0.200°,

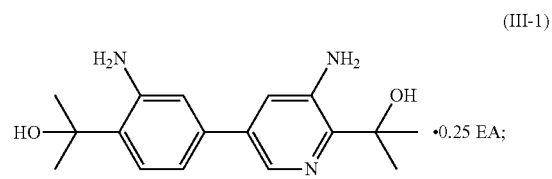 [SMILES: CC(C)(O)c1ccc(-c2cnc(C(C)(C)O)c(N)c2)cc1N]

(III-1)   •0.25 EA;

or,
a crystal form E of the compound of formula (IV-1) according to claim 12, wherein the crystal form E has an X-ray powder diffraction pattern comprising characteristic diffraction peaks at the following 2θ angles: 18.097±0.200°, 18.691±0.200° and 20.693±0.200°,

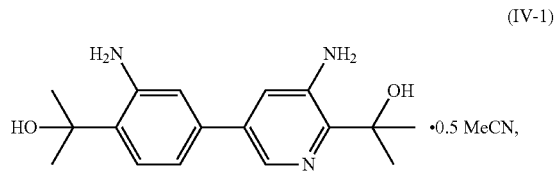

(IV-1)   •0.5 MeCN, or,
a crystal form F of a compound of formula (V), wherein the crystal form F has an X-ray powder diffraction pattern comprising characteristic diffraction peaks at the following 2θ angles: 14.012±0.200°, 16.936±0.200° and 17.424±0.200°,

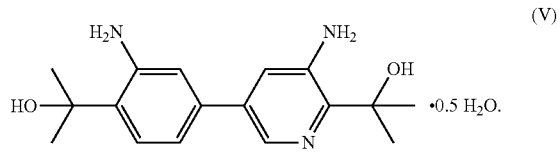 [SMILES: CC(C)(O)c1ccc(-c2cnc(C(C)(C)O)c(N)c2)cc1N]

(V)   •0.5 H₂O.

14. The crystal form according to claim 13, wherein
the X-ray powder diffraction pattern of the crystal form A has characteristic diffraction peaks at the following 2θ angles: 7.14±0.20°, 12.46±0.20°, 15.99±0.20°, 17.06±0.20°, 18.87±0.20°, 20.25±0.20°, 21.41±0.20° and 25.00±0.20°;
or, the X-ray powder diffraction pattern of the crystal form C has characteristic diffraction peaks at the following 2θ angles: 12.871±0.200°, 17.488±0.200°, 18.403±0.200°, 19.079±0.200° and 20.853±0.200°;
or, the X-ray powder diffraction pattern of the crystal form D has characteristic diffraction peaks at the following 2θ angles: 6.600±0.200°, 13.178±0.200°, 17.775±0.200°, 19.138±0.200° and 25.798±0.200°;
or, the X-ray powder diffraction pattern of the crystal form E has characteristic diffraction peaks at the following 2θ angles: 17.465±0.200°, 18.097±0.200°, 18.691±0.200°, 19.179±0.200° and 20.693±0.200°;
or, the X-ray powder diffraction pattern of the crystal form F has characteristic diffraction peaks at the following 2θ angles: 14.012±0.200°, 16.936±0.200°, 17.424±0.200°, 17.954±0.200° and 22.043±0.200°.

15. The crystal form according to claim 14, wherein
the X-ray powder diffraction pattern of the crystal form A
has characteristic diffraction peaks at the following 2θ
angles: 7.14±0.20°, 10.11±0.20°, 12.46±0.20°,
14.35±0.20°, 15.99±0.20°, 17.06±0.20°, 18.87±0.20°,
20.25±0.20°, 21.41±0.20° and 25.00±0.20°;
or, the X-ray powder diffraction pattern of the crystal form
C has characteristic diffraction peaks at the following
2θ angles: 12.871±0.200°, 13.274±0.200°,
14.294±0.200°, 17.488±0.200°, 18.403±0.200°,
19.079±0.200°, 20.853±0.200° and 21.468±0.200°;
or, the X-ray powder diffraction pattern of the crystal form
D has characteristic diffraction peaks at the following
2θ angles: 6.600±0.200°, 13.178±0.200°,
17.303±0.200°, 17.775±0.200°, 18.667±0.200°,
19.138±0.200°, 21.245±0.200° and 25.798±0.200°;
or, the X-ray powder diffraction pattern of the crystal form
E has characteristic diffraction peaks at the following
2θ angles: 6.675±0.200°, 16.119±0.200°,
17.465±0.200°, 18.097±0.200°, 18.691±0.200°,
19.179±0.200°, 20.693±0.200° and 26.658±0.200°;
or, the X-ray powder diffraction pattern of the crystal form
F has characteristic diffraction peaks at the following
2θ angles: 12.567±0.200°, 14.012±0.200°,
15.666±0.200°, 16.936±0.200°, 17.424±0.200°,
17.954±0.200°, 20.717±0.200° and 22.043±0.200°.

16. The crystal form according to claim 15, wherein
the X-ray powder diffraction pattern of the crystal form C
has characteristic diffraction peaks at the following 2θ
angles: 10.105±0.200°, 12.871±0.200°,
13.274±0.200°, 14.294±0.200°, 17.488±0.200°,
18.403±0.200°, 19.079±0.200°, 20.853±0.200°,
21.468±0.200°, 22.647±0.200°, 23.977±0.200° and
24.409±0.200°;
or, the X-ray powder diffraction pattern of the crystal form
D has characteristic diffraction peaks at the following
2θ angles: 6.600±0.200°, 11.004.200°, 13.178±0.200°,
15.521±0.200°, 16.592±0.200°, 17.303±0.200°,
17.775±0.200°, 18.667±0.200°, 19.138±0.200°,
21.245±0.200°, 25.798±0.200° and 27.353±0.200°;
or, the X-ray powder diffraction pattern of the crystal form
E has characteristic diffraction peaks at the following
2θ angles: 6.675±0.200°, 8.741±0.200°,
11.391±0.200°, 13.762±0.200°, 16.119±0.200°,
17.465±0.200°, 18.097±0.200°, 18.691±0.200°,
19.179±0.200°, 20.693±0.200°, 23.386±0.200° and
26.658±0.200°;
or, the X-ray powder diffraction pattern of the crystal form
F has characteristic diffraction peaks at the following
2θ angles: 6.104±0.200°, 6.104±0.200°,
12.567±0.200°, 14.012±0.200°, 15.666±0.200°,
16.936±0.200°, 17.424±0.200°, 17.954±0.200°,
20.717±0.200°, 22.043±0.200° and 25.436±0.200°.

17. The crystal form according to claim 16, wherein
the X-ray powder diffraction pattern of the crystal form A
has characteristic diffraction peaks at the following 2θ
angles: 7.142°, 8.234°, 10.112°, 11.302°, 12.056°,
12.377°, 12.456°, 14.086°, 14.347°, 15.993°, 16.5300,
16.834°, 17.057°, 17.482°, 18.868°, 20.249°, 21.413°,
22.599°, 22.721°, 23.750°, 23.941°, 24.191°, 24.763°,
24.995°, 25.897°, 27.931°, 29.566°, 30.442°, 31.373°,
31.582°, 32.162°, 32.936°, 33.830°, 34.537°, 34.774°,
35.312°, 36.107°, 36.401° and 37.575°;
or, the X-ray powder diffraction pattern of the crystal form
C has characteristic diffraction peaks at the following
2θ angles: 9.128°, 10.105°, 12.871°, 13.274°, 13.933°,
14.294°, 16.420°, 17.488°, 18.403°, 19.079°, 20.853°,
21.468°, 22.647°, 23.042°, 23.507°, 23.977°, 24.409°,
24.798°, 25.861°, 26.309°, 28.698°, 30.293° and
37.464°;
or, the X-ray powder diffraction pattern of the crystal form
D has characteristic diffraction peaks at the following
2θ angles: 6.600°, 8.659°, 9.558°, 11.004°, 12.463°,
13.178°, 13.728°, 14.871°, 15.521°, 16.592°, 17.303°,
17.775°, 18.379°, 18.667°, 19.138°, 20.572°, 21.245°,
21.989°, 22.247°, 22.561°, 23.940°, 25.087°, 25.798°,
26.686°, 27.353°, 28.044°, 28.859°, 29.645°, 30.375°,
32.351°, 34.603°, 35.456° and 39.550°;
or, the X-ray powder diffraction pattern of the crystal form
E has characteristic diffraction peaks at the following
2θ angles: 6.675°, 8.741°, 9.365°, 11.391°, 12.205°,
13.310°, 13.762°, 15.302°, 16.119°, 16.407°, 17.465°,
18.097°, 18.691°, 19.179°, 20.693°, 21.329°, 21.860°,
22.674°, 23.386°, 24.819°, 25.311°, 25.757°, 26.658°,
26.980°, 29.110°, 29.540°, 30.536°, 31.639°, 33.068°,
33.972°, 36.724° and 38.646°,
or, the X-ray powder diffraction pattern of the crystal form
F has characteristic diffraction peaks at the following
2θ angles: 6.104°, 9.825°, 12.567°, 14.012°, 15.666°,
16.936°, 17.424°, 17.954°, 19.298°, 20.717°, 21.106°,
22.043°, 25.436°, 26.230°, 26.94° and 29.721°.

Figure 6:
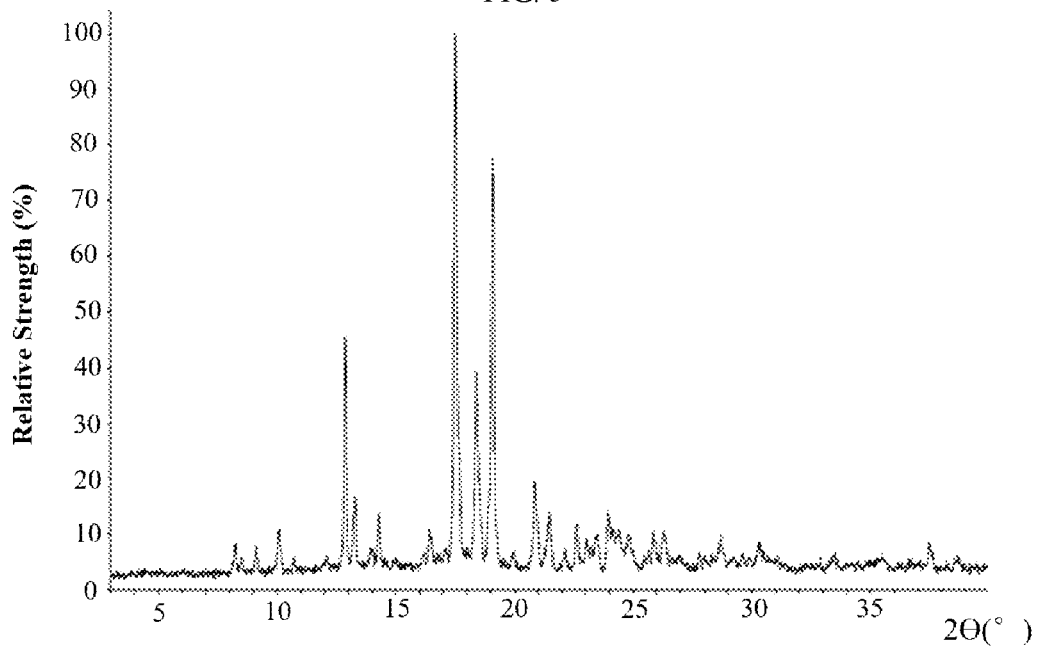
FIG. 6 is the Cu-Kα radiation XRPD pattern of the crystal form C of the compound of formula (I).
Figure 8:
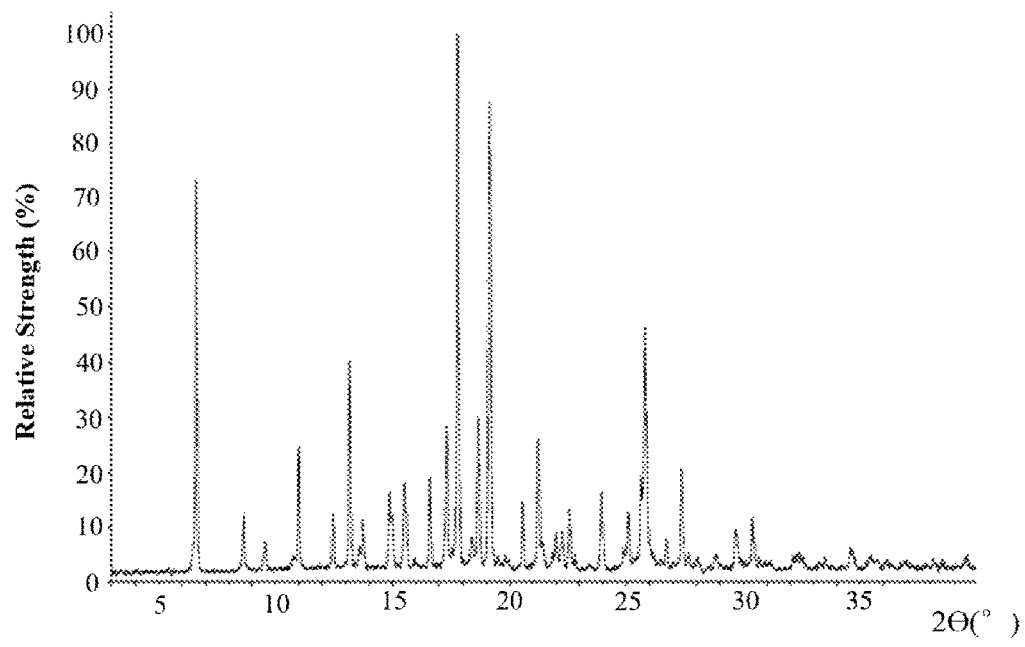
FIG. 8 is the Cu-Kα radiation XRPD pattern of the crystal form D of the compound of formula (III-1).
Figure 10:
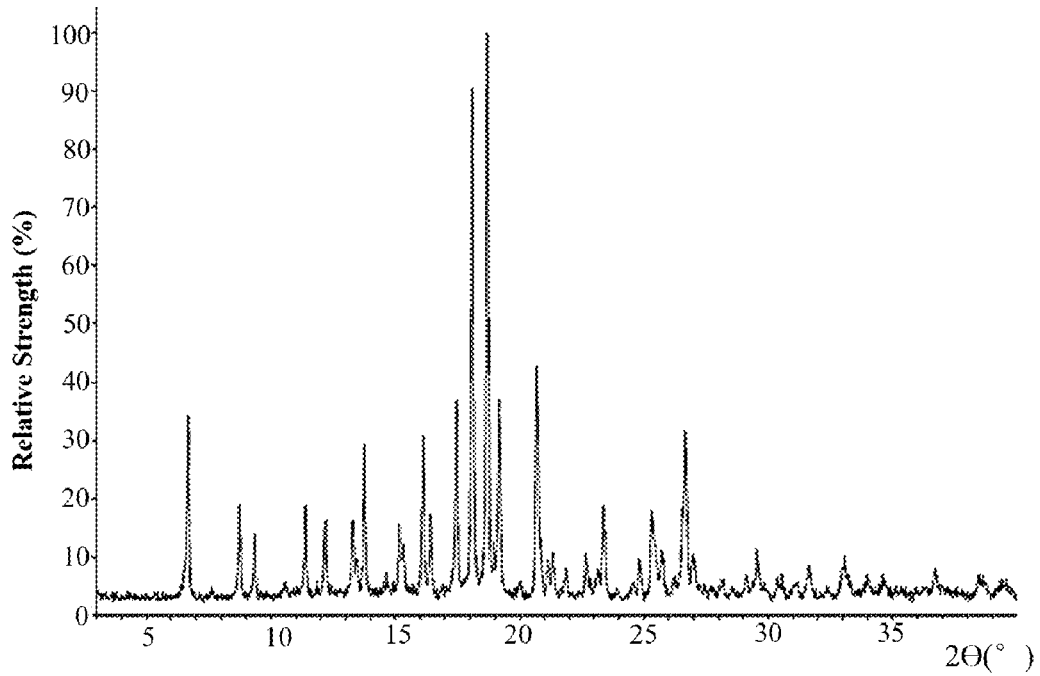
FIG. 10 is the Cu-Kα radiation XRPD pattern of the crystal form E of the compound of formula (IV-1).
Figure 12:
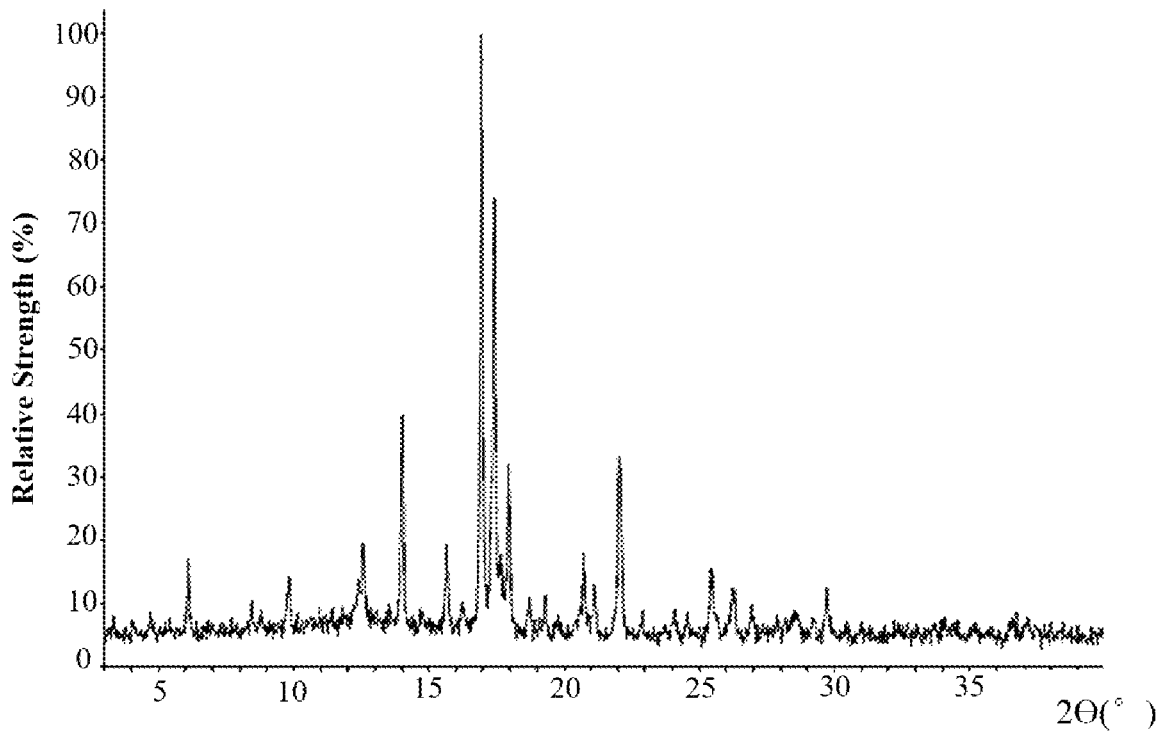
FIG. 12 is the Cu-Kα radiation XRPD pattern of the crystal form F of the compound of formula (V).

18. The crystal form according to claim 17, wherein
the XRPD pattern of the crystal form A is as shown in
FIG. 1;
or, the XRPD pattern of the crystal form C is as shown in
FIG. 6;
or, the XRPD pattern of the crystal form D is as shown in
FIG. 8;
or, the XRPD pattern of the crystal form E is as shown in
FIG. 10;
or, the XRPD pattern of the crystal form F is as shown in
FIG. 12.

Figure 2:
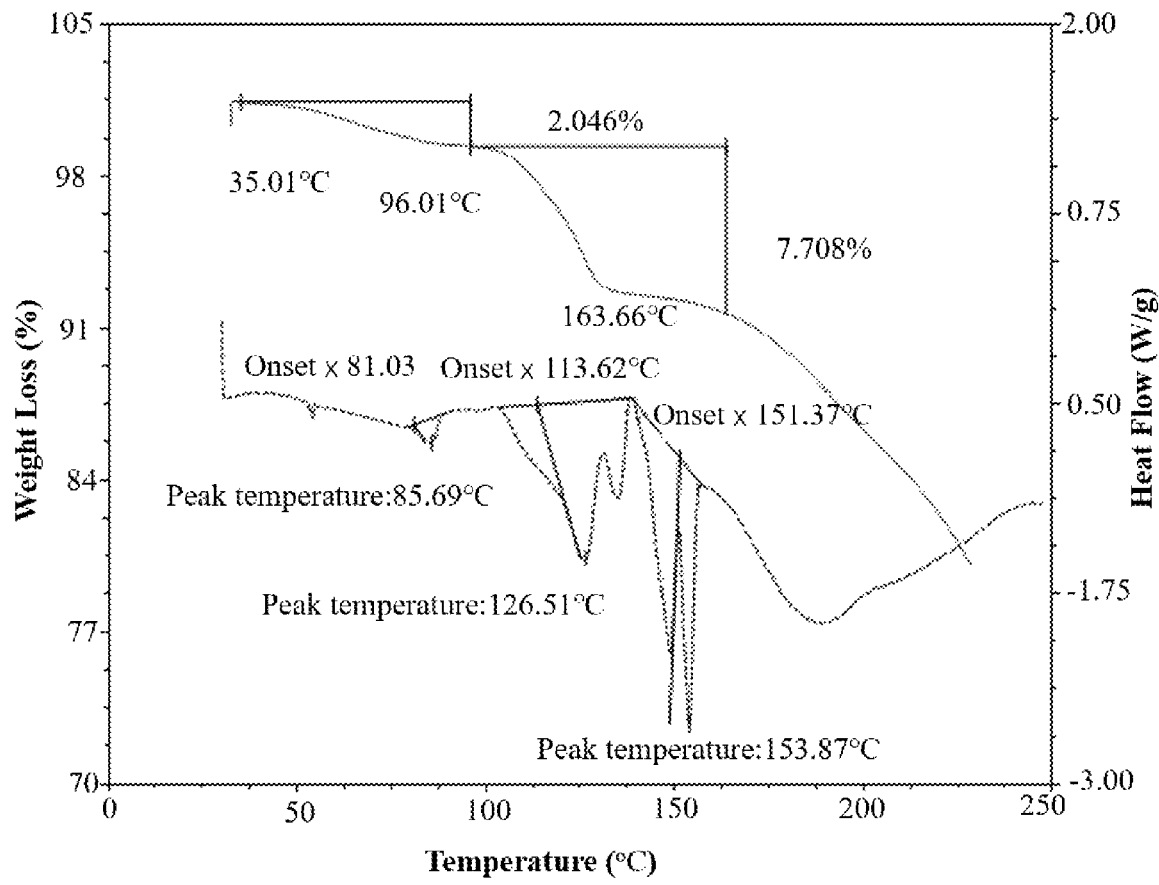
FIG. 2 is the DSC and TGA spectrum of the crystal form A of the compound of formula (I).
Figure 11:
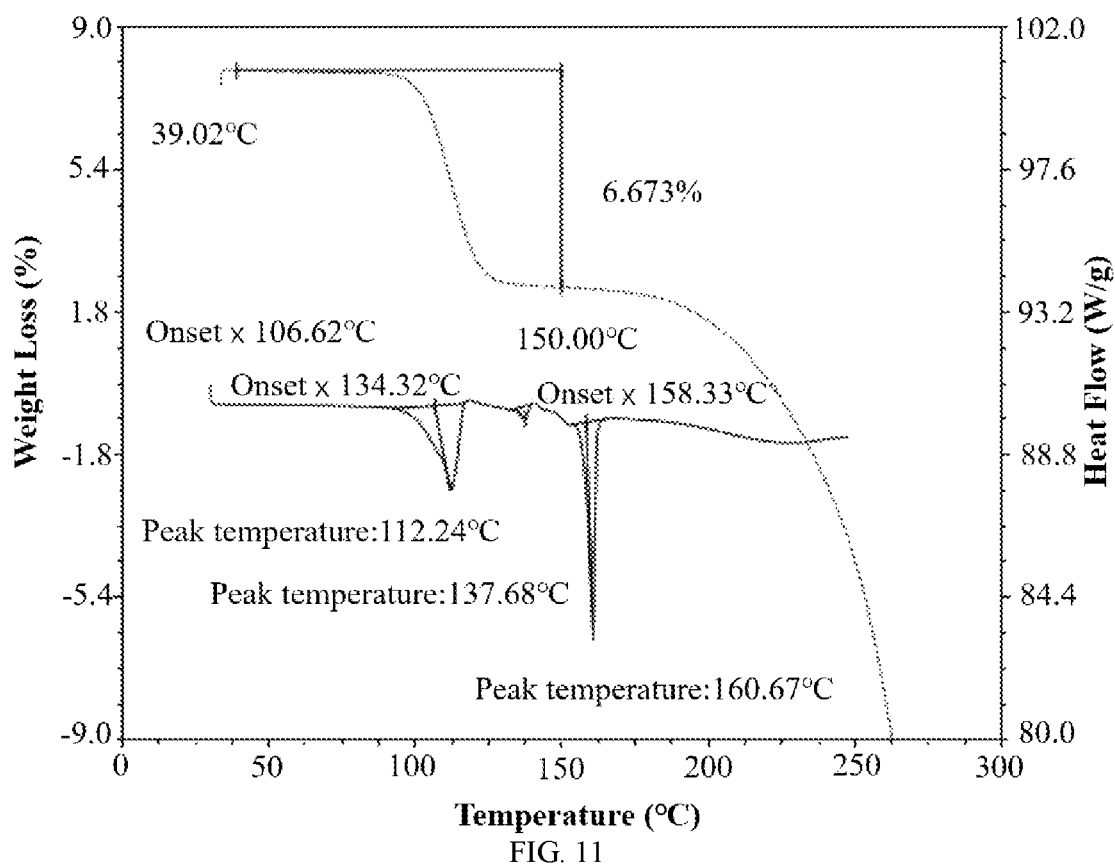
FIG. 11 is the DSC and TGA spectrum of the crystal form E of the compound of formula (IV-1).
Figure 13:
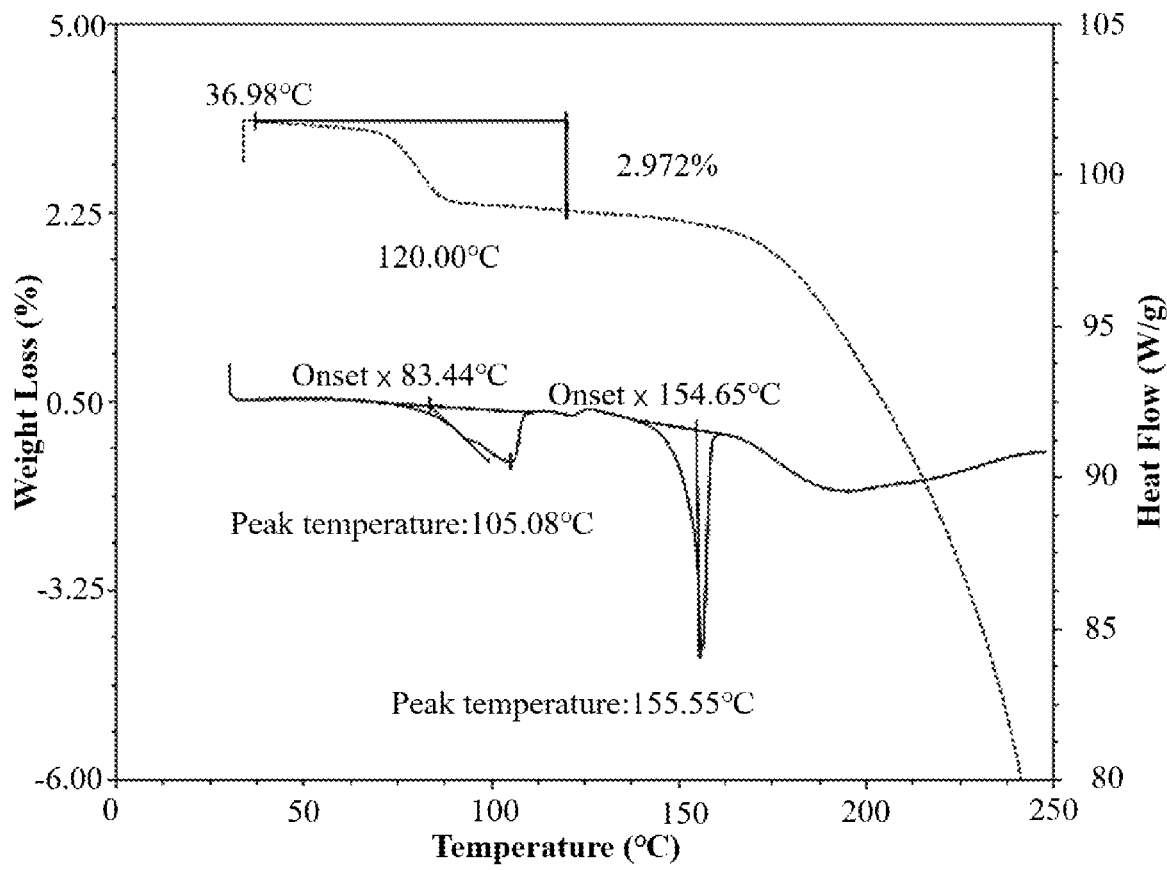
FIG. 13 is the DSC and TGA spectrum of the crystal form F of the compound of formula (V).

19. The crystal form according to claim 13, wherein
the differential scanning calorimetry curve of the crystal
form A has endothermic peaks with an onset at
81.03±3.0° C., 113.62±3.0° C. and 151.37±3.0° C.,
respectively; the DSC spectrum of the crystal form A is
as shown in FIG. 2;
or, the differential scanning calorimetry curve of the
crystal form C has an endothermic peak with an onset
at 157.36±3.0° C.; the DSC spectrum thereof is as
shown in FIG. 7;
or, the differential scanning calorimetry curve of the
crystal form D has endothermic peaks with an onset at
116.98±3.0° C., 133.04±3.0° C. and 154.86±3.0° C.,
respectively; the DSC spectrum thereof is as shown in
FIG. 9;
or, the differential scanning calorimetry curve of the
crystal form E has endothermic peaks with an onset at
106.62±3.0° C., 134.32±3.0° C. and 158.33±3.0° C.,
respectively; the DSC spectrum of the crystal form E is
as shown in FIG. 11;
or, the differential scanning calorimetry curve of the
crystal form F has endothermic peaks with an onset at
83.44±3.0° C. and 154.65±3.0° C., respectively;
the DSC spectrum of the crystal form F is as shown in
FIG. 13.

Figure 7:
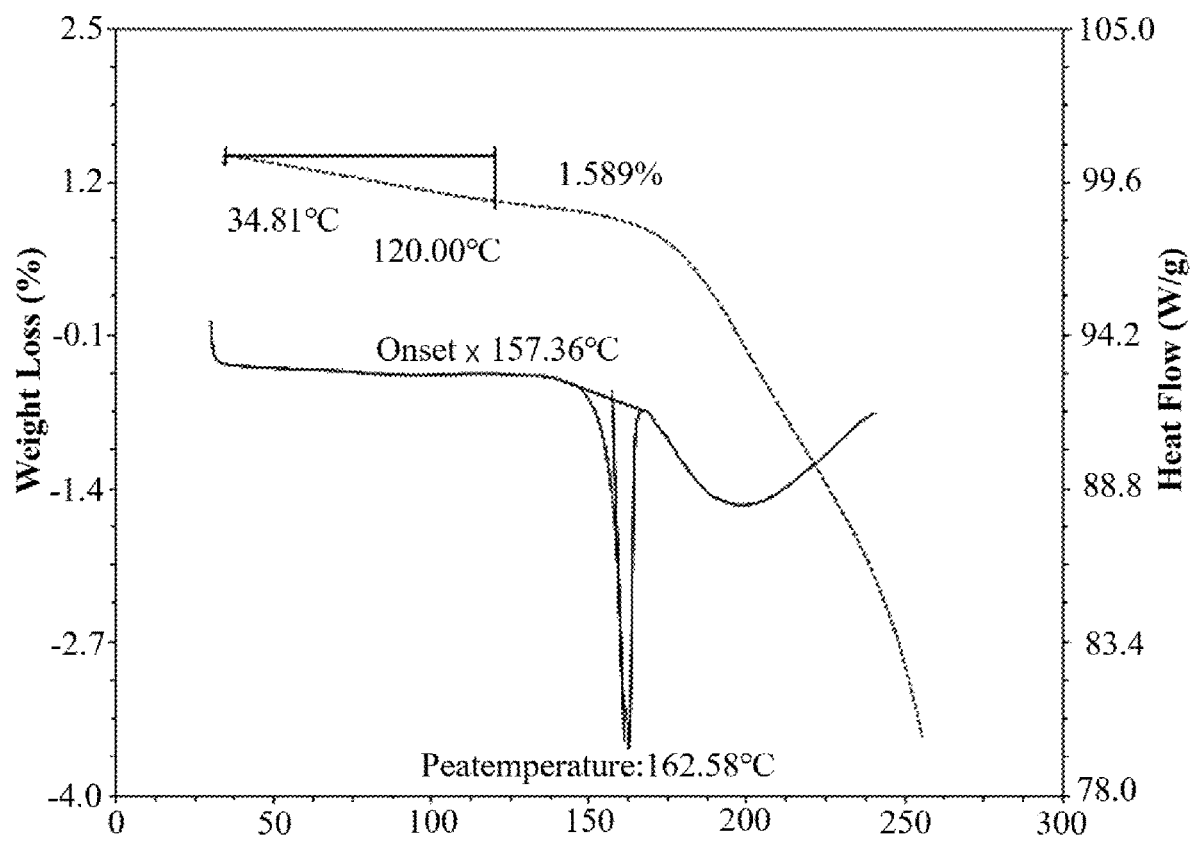
FIG. 7 is the DSC and TGA spectrum of the crystal form C of the compound of formula (I).
Figure 9:
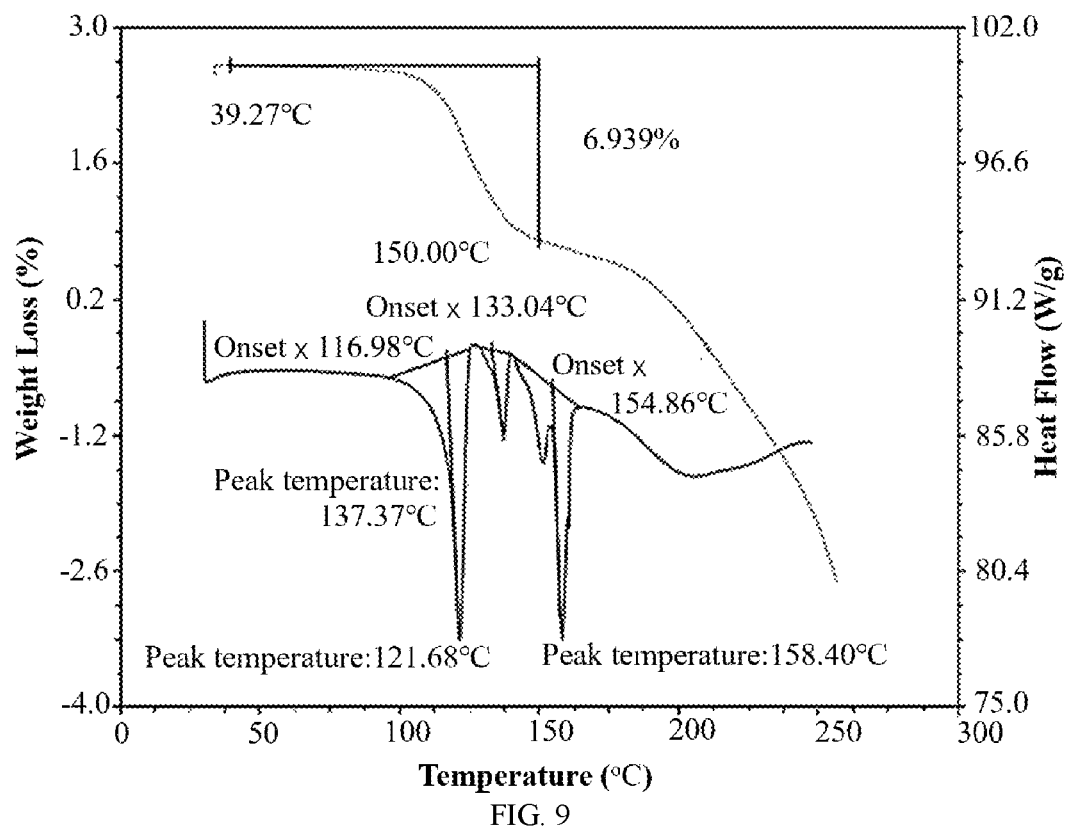
FIG. 9 is the DSC and TGA spectrum of the crystal form D of the compound of formula (III-1).

20. The crystal form according to claim 13, wherein
the thermogravimetric analysis curve of the crystal form
A has a weight loss of 2.046% at 96.01° C.±3.0° C., and
a weight loss of 7.708% at 163.66° C.±3.0° C.; the
thermogravimetric analysis spectrum of the crystal
form A is as shown in FIG. 2;

or, the thermogravimetric analysis curve of the crystal form C has a weight loss of 1.589% at 120.00° C.±3.0° C.; the TGA spectrum of the crystal form C is as shown in FIG. 7;

or, the thermogravimetric analysis curve of the crystal form D has a weight loss of 6.939% at 150.00° C.±3.0° C.; the TGA spectrum of the crystal form D is as shown in FIG. 9;

or, the thermogravimetric analysis curve of the crystal form E has a weight loss of 6.673% at 150.00° C.±3.0° C.; the TGA spectrum of the crystal form E is as shown in FIG. 11;

or, the thermogravimetric analysis curve of the crystal form F has a weight loss of 2.972% at 120.00° C.±3.0° C.; the TGA spectrum of the crystal form F is as shown in FIG. 13.

\* \* \* \* \*